United States Patent
Beall et al.

(10) Patent No.: US 7,520,911 B2
(45) Date of Patent: Apr. 21, 2009

(54) POROUS CORDIERITE CERAMIC HONEYCOMB ARTICLE WITH IMPROVED STRENGTH AND METHOD OF MANUFACTURING SAME

(75) Inventors: Douglas Munroe Beall, Painted Post, NY (US); Gregory Albert Merkel, Corning, NY (US); David John Thompson, Savona, NY (US)

(73) Assignee: Corning Incorporated, Corning, NY (US)

( * ) Notice: Subject to any disclaimer, the term of this patent is extended or adjusted under 35 U.S.C. 154(b) by 513 days.

(21) Appl. No.: 11/291,687

(22) Filed: Nov. 30, 2005

(65) Prior Publication Data

US 2007/0119133 A1 May 31, 2007

(51) Int. Cl.
*B01D 39/20* (2006.01)
*B01D 46/00* (2006.01)
*F01N 3/022* (2006.01)

(52) U.S. Cl. ............... 55/523; 55/282.3; 55/385.3; 55/524; 55/DIG. 5; 55/DIG. 10; 55/DIG. 30; 60/299; 60/311; 428/116; 264/44; 264/628; 264/630; 264/631; 264/DIG. 48; 501/9; 422/180

(58) Field of Classification Search ............... 55/282.2, 55/282.3, 385.3, 523, 524, DIG. 5, DIG. 10, 55/DIG. 30; 60/295, 297, 299, 303, 311; 428/116, 117, 118; 264/43, 44, 628, 630, 264/631, DIG. 48; 501/9, 119; 422/177, 422/180

See application file for complete search history.

(56) References Cited

U.S. PATENT DOCUMENTS

| | | | | |
|---|---|---|---|---|
| 3,885,977 A | * | 5/1975 | Lachman et al. | ............ 501/119 |
| 4,632,683 A | * | 12/1986 | Fukutani et al. | ............... 55/523 |
| 6,087,281 A | * | 7/2000 | Merkel | ......................... 501/9 |
| 6,210,626 B1 | * | 4/2001 | Cornelius et al. | ........... 264/631 |
| 6,214,437 B1 | | 4/2001 | Beall et al. | .................. 428/116 |
| 6,284,693 B1 | * | 9/2001 | Beall et al. | .................. 501/119 |
| 6,541,407 B2 | * | 4/2003 | Beall et al. | .................... 55/523 |
| 6,773,481 B2 | * | 8/2004 | Noguchi et al. | ............... 55/523 |
| 2004/0029707 A1 | * | 2/2004 | Beall et al. | .................. 501/119 |
| 2004/0148916 A1 | * | 8/2004 | Merkel | ......................... 55/523 |

FOREIGN PATENT DOCUMENTS

WO 99/43629 9/1999

\* cited by examiner

*Primary Examiner*—Jason M Greene
(74) *Attorney, Agent, or Firm*—Matthew B. McNutt

(57) ABSTRACT

A porous cordierite ceramic honeycomb article with increased mechanical strength and thermal shock resistance. The porous cordierite ceramic honeycomb article has $M_A < 2220$, or $M_T > 2660$ wherein $$M_A = 3645(I_A) - 106(CTE) + 19(d_{90}) + 17(\% \text{ porosity}),$$

$$M_T = 4711(I_T) + 116(CTE) - 26(d_{90}) - 28(\% \text{ porosity}),$$

and a CTE $\leq 9 \times 10^{-7}/^\circ$ C. in at least one direction. A method of manufacturing is also disclosed wherein the inorganic raw material mixture contains talc, an alumina-forming source, a silica-forming source, and 0-18 wt. % of a kaolin or calcined kaolin containing not more than 8 wt. % of a fine kaolin source having a median particle diameter of less than 7 μm, wherein the fired porous ceramic cordierite honeycomb article has a porosity<54%. Alternatively, if greater than 8 wt. % of the fine kaolin source is used, then a slow ramp rate is utilized from 1200° C. to 1300° C. of not more than 20° C./hr.

32 Claims, 5 Drawing Sheets

POROUS CORDIERITE CERAMIC HONEYCOMB ARTICLE WITH IMPROVED STRENGTH AND METHOD OF MANUFACTURING SAME

TECHNICAL FIELD OF THE INVENTION

The present invention relates to a porous cordierite ceramic honeycomb article and method of manufacturing same. More particularly, the invention is directed to a cordierite honeycomb article having improved strength and thermal shock resistance.

BACKGROUND OF THE INVENTION

Diesel engines provide lower emissions and increased fuel economy compared to gasoline engines; however, environmental hazards may be posed by diesel exhaust emissions. Diesel particulate filters are now being deployed to control particulate emissions from diesel-powered equipment such as trucks, buses, diesel electric locomotives and generators. In particular, diesel particulate filters control particulate emissions by physically trapping soot particles in their structure. Diesel particulate filters are preferably constructed as wall-flow monoliths, which allow exhaust gases to flow through their porous ceramic walls, while any particulate present in the exhaust gas is collected on the upstream side of the wall. Once a predetermined condition is met, the filter may be cleaned by a regeneration cycle, during which the temperature of the exhaust gas is high enough to ignite and burn out any particulate soot. This regeneration cycle reduces the backpressure of the diesel particulate filter near to that of a new filter. The surface of the walls or the porous interior of the walls may include a catalyst wash coat containing platinum (Pt), palladium (Pd), iron (Fe), strontium (Sr) or rare earth elements such as cerium (Ce) to lower the temperature required for regeneration of the filter and to convert hydrocarbons and carbon monoxide in the exhaust gases into non-hazardous water vapor and carbon dioxide.

One preferred material for the manufacture of high temperature components is cordierite ($Mg_2Al_4Si_5O_{18}$), a magnesium aluminum silicate, that often includes low levels of iron or other impurities. Cordierite is a desired material for the manufacture of diesel particulate filters and other high temperature articles, such as catalytic converters, NOx adsorber substrates, catalyst substrates, and honeycomb articles because of its relatively low cost. Cordierite materials are typically manufactured by mixing a raw batch that includes talc, alumina, aluminum hydroxide, kaolin and silica. The batch is then blended with a binder (such as methylcellulose) and a lubricant (such as sodium stearate) to form a plastic mixture. This plastic mixture is then formed into a green body and sintered. U.S. Pat. No. 6,864,198 (hereby incorporated by reference in its entirety) assigned to Corning Incorporated discloses one method of forming a cordierite honeycomb structure.

During the regeneration of a cordierite DPF, heating of the core region creates a large thermal gradient across the radius of the filter, such that, for example, the core may be at 800° C. to 1000° C. while the periphery near the skin is at 400° C. to 500° C. Due to the positive coefficient of thermal expansion, CTE, of cordierite from 400 to 1000° C., the filter's core expands in the axial direction more than does the filter's outer shell. Consequently, strain is created between the skin and the core such that the core is in compression and the skin is in tension. If the stresses are sufficiently large, the skin may fracture, creating one or more cracks than encircle part or all the filter's circumference, orthogonal to the axial direction. Likewise, axial thermal gradients along the length of the filter may result in the face of the filter (inlet or outlet end) having a lower temperature than the interior of the filter. In such cases the face will be in tension, and face-cracking may occur. Such fractures of either type may compromise the filter's mechanical integrity, or filtration efficiency. Accordingly, cordierite filter articles which have better resistance to the formation of such cracks are highly desired.

Thermal stresses can be reduced by regenerating the filter more frequently before large amounts of soot can accumulate, thereby reducing both the maximum internal temperature and thermal gradient. However, increasing the frequency with which energy is supplied to raise the temperature of the exhaust gas entering the filter and, thus, initiate regeneration, results in lower fuel economy. Thus, it would be highly desirable to increase the filter's intrinsic thermal stress resistance, so that regeneration cycles may occur less frequently.

Thus, cordierite honeycomb articles having increased strength for greater mechanical durability, in combination with higher thermal shock resistance are much sought after. Such increases in strength and thermal shock resistance cannot, however, come at the expense of other important properties, such as clean pressure drop, and filtration efficiency, for example. Accordingly, there is a need for cordierite articles which exhibit improved strength and durability in regards to exposure to thermal cycles.

SUMMARY OF THE INVENTION

The present invention provides an improved porous ceramic cordierite honeycomb article with increased mechanical strength and thermal shock resistance for a given percent porosity, pore size distribution, and coefficient of thermal expansion. Embodiments of the porous ceramic cordierite honeycomb article of the present invention and a method for its manufacture are disclosed herein.

Advantageously, the present invention includes a reduced amount of microcracking while increasing the volume fraction of cordierite crystals having their negative-CTE crystallographic "c-axes" aligned within the plane of the honeycomb wall, while reducing the volume fraction of cordierite crystals having their positive-CTE crystallographic "a- and b-axes" aligned within the plane of the honeycomb wall. Thus, desirably, the strength of the honeycomb article is increased due to less microcracking, while low CTE is maintained due to increased cordierite crystal orientation with their "c-axes" parallel to the plane of the wall.

As such, the present invention provides a unique combination of porosity, pore size distribution, coefficient of thermal expansion, and crystallite orientation within the walls of the article to provide increased strength while maintaining a high thermal shock parameter, TSP. Specifically, the inventors herein have discovered that porous cordierite ceramic honeycomb articles have improved strength and a high thermal shock parameter, TSP, when their porosity, pore size distribution, CTE, and crystal orientation within the walls satisfy the following relationships:

$M_A < 2220$, or $M_T > 2660$, where $$M_A = 3645(I_A) - 106(CTE) + 19(d_{90}) + 17(\% \text{ porosity}) \quad (\text{EQ. 1})$$

and $$M_T=4711(I_T)+116(CTE)-26(d_{90})-28(\% \text{ porosity}) \quad \text{(EQ. 2)}$$

and wherein the mean CTE from 25 to 800° C. is not more than $9\times10^{-7}/°$ C. in at least one direction.

In EQ. 1 and 2 above, CTE is the mean coefficient of thermal expansion from 25 to 800° C. in units of $10^{-7}/°$ C. as measured by dilatometry on a specimen parallel to the lengths of the channels of the honeycomb article. Thus, a CTE of $8.0\times10^{-7}$ °C.$^{-1}$ would be entered as "8.0" in both EQ. 1 and EQ. 2. The % porosity is the volume percentage of porosity in the walls of the article as measured by mercury porosimetry, and can, in principle, range from 0 to nearly 100 (though typically only up to about 80%), and is dimensionless. Thus, a % porosity of 45% would be entered as "45" in both EQ. 1 and EQ. 2. The term $d_{90}$ is measured by mercury porosimetry and is the pore diameter, in μm, at which 90% (by volume) of the pores have a smaller diameter (equal to the pore diameter at which the cumulative mercury intrusion volume equals 10% of the total mercury intrusion volume). A value of $d_{90}$ equal to 30 μm would be entered as "30" in both EQ. 1 and EQ. 2, for example. $I_A$ is the axial XRD I-ratio (I-ratio measured on the axial cross section of the honeycomb) and $I_T$ is the transverse XRD I-ratio (I-ratio measured on the transverse, as-fired wall surface). The I-ratio is defined by the relationship:

$$I(110)/[I(110)+I(002)] \quad \text{(EQ. 3)}$$

where I(110) and I(002) are the peak heights of the XRD reflections from the (110) and (002) planes in the cordierite crystal lattice, based upon hexagonal indexing of the XRD peaks. The I-ratio is measured by x-ray diffractometry using copper Kα radiation on either the axial cross section (orthogonal to the length of the channels) or the transverse surface (as-fired surface of the honeycomb walls). The values of $I_A$ and $I_T$ can range from 0.0 to 1.0, and are dimensionless.

According to preferred embodiments of the invention, the porous honeycomb article has a porosity of at least 40%, but less than 54%, and a median pore diameter, $d_{50}\geq10$ μm; more preferably $d_{50}\geq13$ μm. The median pore diameter, $d_{50}$, is the pore diameter at which the cumulative mercury intrusion volume equals 50% of the total mercury intrusion volume. According to additional embodiments of the invention, $M_A<2000$ or $M_T>2900$; or even $M_A<1800$ or $M_T>3000$; and in some embodiments, $M_A<2000$ and $M_T>2800$.

Additionally, the honeycomb article of the present invention may also exhibit a thermal shock parameter, TSP, that is at least 550° C., where the TSP is defined by the following relationship:

$$TSP=MOR(25° C.)/\{[E(25° C.)][CTE'(500-900° C.)]\} \quad \text{(EQ. 4)}$$

where MOR is the modulus of rupture, measured at room temperature (25° C.) by the four-point loading method on a 1 inch×0.5 inch×5 inch bar cut parallel to the length of the channels (hereafter referred to as the "axial direction"), E is the elastic modulus, also known as Young's modulus, measured in the axial direction at room temperature (25° C.) by a sonic resonance technique on a 1 inch×0.5 inch×5 inch bar, and CTE' is the mean coefficient of thermal expansion measured in the axial direction during heating from 500 to 900° C. by dilatometry on a 0.25 inch×0.25 inch×2 inch bar. A CTE' of $8\times10^{-7}/°$ C. would be entered as "$8\times10^{-7}/°$ C." in EQ. 4, an elastic modulus of $1.2\times10^6$ psi would be entered as "$1.2\times10^6$" in EQ. 4, and an MOR of 1000 psi would be entered as "1000" in EQ. 4.

According to another aspect of the invention, a method for manufacturing a cordierite honeycomb article is described. The method preferably includes preparation of an inorganic raw material batch mixture of talc, an aluminum-oxide forming source, a silica-forming source, and 0-18 wt. % kaolin or calcined kaolin wherein less than 8 wt. % of a fine kaolin source is utilized, or wherein when the content of fine kaolin is greater than 8 wt. %, then a heating rate from 1200 to 1300° C. is not more than 20° C./hr. In other words, a higher weight % of fine kaolin may be tolerated and still achieve desirable end properties, as long as the heating rate within the temperature range of 1200-1300° C. is low enough. The inorganic raw material batch mixture may be formed into or otherwise used on a honeycomb article by any known techniques including: doctor-blading, spraying, tape-casting, calendaring, painting or extrusion. The raw material mixture may also be used for a coating, plug or skin on honeycomb ceramic article, and may be extruded to form the honeycomb article. A finished honeycomb article is preferably prepared by firing at a temperature and time sufficient to form a ceramic having a high percentage of cordierite.

The honeycomb article of the present invention is useful, and best embodied, as a high temperature honeycomb article, such as diesel particulate filters, a catalytic converter, a $NO_x$ adsorber, a catalyst substrate, or a flow filter body for high temperature fluids or in other high temperature applications.

DETAILED DESCRIPTION AND PREFERRED EMBODIMENTS OF THE INVENTION

Figure 1:
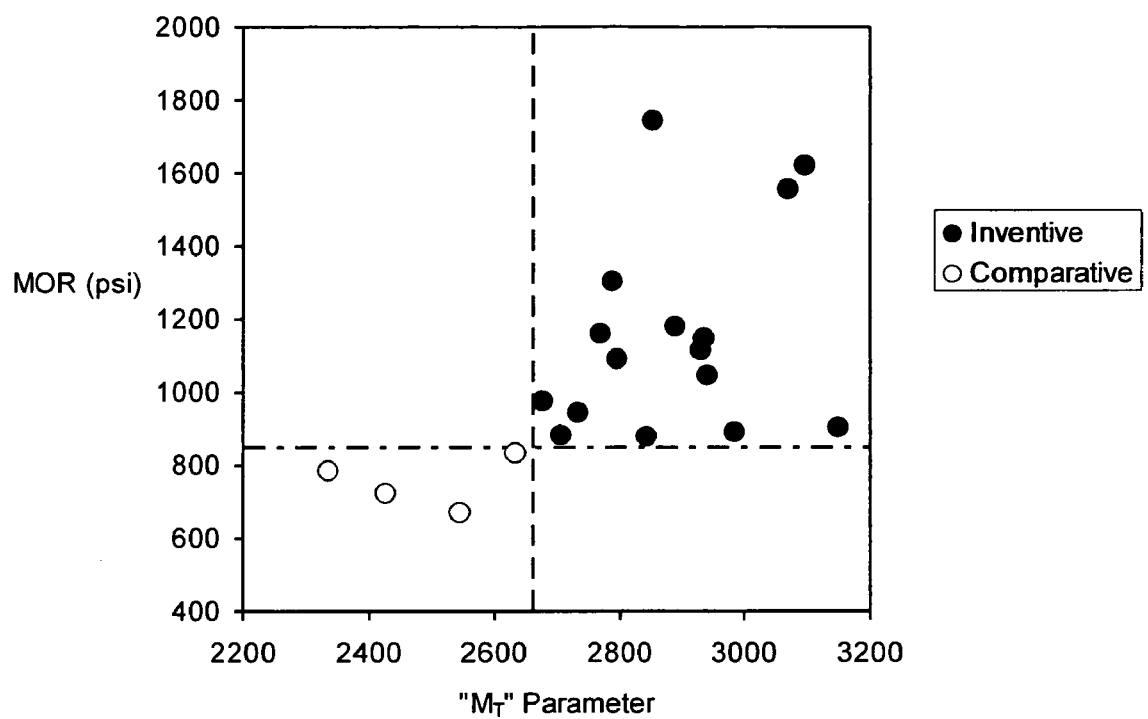
FIG. 1 shows a plot of MOR values (psi) versus the "$M_T$" Parameter computed using EQ. 2 according to the invention.

The present invention is an improved porous ceramic cordierite article having improved material strength and low CTE. As used herein, CTE shall refer to the mean coefficient of thermal expansion (from 25 to 800° C.) as measured by dilatometry parallel to the length of the channels (axial direction), unless otherwise specified. As was discovered by the inventors herein, a reduction in microcracking in the article is primarily responsible for the increase in strength, while alignment of the cordierite crystals is primarily responsible for achieving low CTE. Both have been achieved simultaneously.

In particular, the cordierite honeycomb article of the present invention advantageously exhibits increased alignment of the c-axes of the cordierite crystals with the plane of the walls of the honeycomb article. The c-axis of cordierite crystals has a negative CTE and by aligning the c-axes, the present invention provides a low CTE in any direction that is parallel to the plane of the wall in the cordierite article. It has been discovered that reducing or eliminating the kaolin, especially any fine kaolin, from the raw material mixture increases the degree of alignment of the c-axes of the cordierite crystals with the plane of the honeycomb wall and improves (reduces) the axial CTE (that is, CTE in the axial direction of the honeycomb) of the finished (fired) article. It has also been discovered that reducing or eliminating fine kaolin from the raw material mixture reduces the amount of microcracking in the fired article. A reduction in microcracking tends to increase the CTE of the fired article, but also increases the modulus of rupture and the elastic modulus.

The strength of a cordierite honeycomb article is important for thermal shock resistance as well as long-term mechanical durability (resistance to mechanical failure) when used in an application in which there is considerable vibration, such as a flow-through catalytic converter or wall-flow diesel particulate filter. The intrinsic strength of the wall of the honeycomb article is also limited by the amount of porosity in the body and by the size and volume percentage of the largest pores, as well as by the degree of microcracking.

It has been discovered that, when the values of certain measurable microstructural properties lie within a specific range, the strength of the honeycomb body is enhanced without sacrificing the coefficient of thermal expansion, and the thermal shock resistance is preserved or even increased. This is especially important when the honeycomb article is used as a particulate filter, because porosities greater than 40% are desirable to achieve low pressure drop across the filter, and high porosity tends to reduce the strength of the body. Thus, porosity should preferably be less than 54%. While a variety of median pore diameters are useful, the optimum median pore diameter, $d_{50}$, is preferably 10 µm<$d_{50}$<25 µm, which provides a balance between pressure drop and particulate filtration. At median pore diameters below about 10 µm, pressure required to force particulate laden gases through the wall increases and may interfere with the operation of an internal combustion engine. At median pore diameters above about 25 µm, particulates may pass through the filter, decreasing filtration efficiency.

FIG. 1 shows a plot of values of the modulus of rupture (MOR), in psi, for bars of the honeycomb article cut parallel to the channels having approximately 200 cell/inch$^2$ and approximately a 0.020 inch thick wall, "200/20," plotted against values of the "$M_T$" Parameter. The $M_T$ Parameter is computed from CTE, transverse I-ratio ($I_T$), % porosity, and $d_{90}$ pore size according to the invention as described in EQ. 2 above. Inventive honeycomb ceramic articles have a calculated "$M_T$" parameter that is preferably greater than 2660, resulting in an MOR of a 200/20 cordierite honeycomb article that is greater than 850 psi (filled circles). Comparative examples have calculated "$M_T$" parameter values that are less than 2660, and generally have MOR values of 200/20 honeycombs that are less than 850 psi (open circles).

Figure 2:
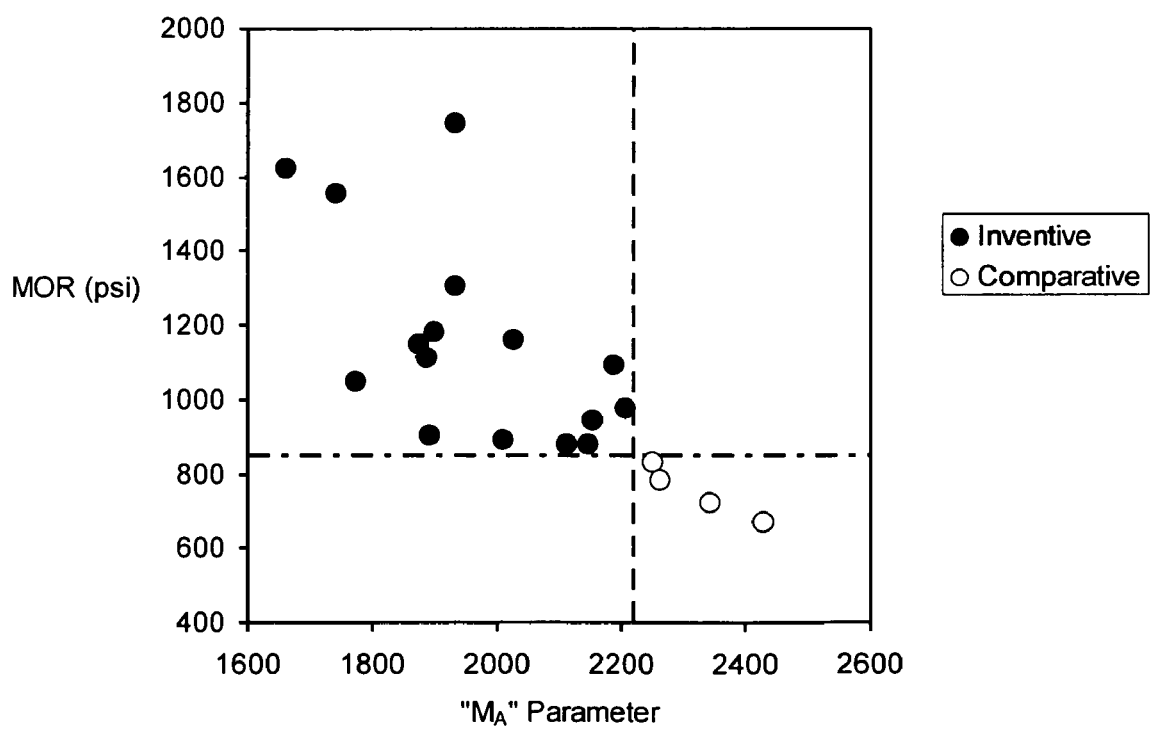
FIG. 2 shows a plot of MOR values versus the "$M_A$" Parameter computed using EQ. 1 according to the invention.

FIG. 2 shows a plot of the values of the modulus of rupture (MOR), in psi, for bars of the honeycomb article cut parallel to the channels having approximately 200 cell/inch$^2$ and approximately a 0.020 inch thick wall plotted against values of the "$M_A$" Parameter. The "$M_A$" Parameter is computed from CTE, axial I-ratio ($I_A$), % porosity, and $d_{90}$ pore size as described in EQ. 1 above. Inventive articles have a calculated "$M_A$" parameter that is preferably less than 2220, resulting in an MOR of a 200/20 cordierite honeycomb article that is preferably greater than 850 psi (filled circles). Comparative examples have calculated "$M_A$" parameters that are greater than 2220, and also generally have MOR values of 200/20 honeycombs that are less than 850 psi (open circles).

Figure 3:
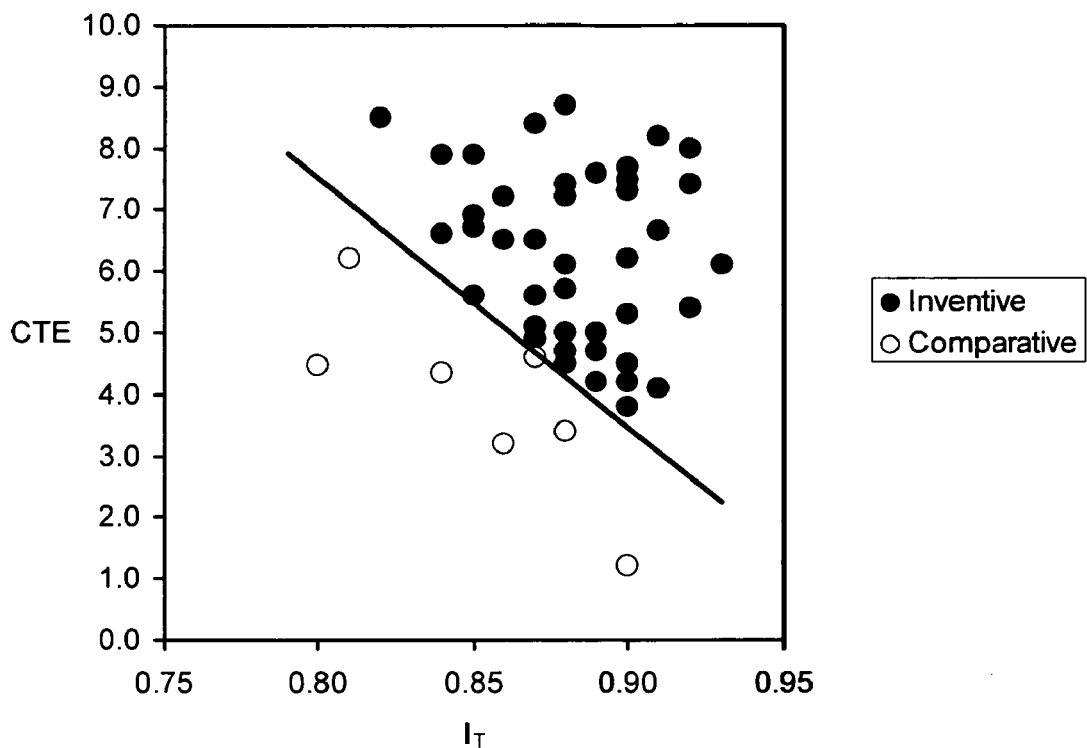
FIG. 3 shows CTE ($10^{-7}/°$ C.) versus the transverse I-ratio, $I_T$ according to the invention.

FIG. 3 shows the mean CTE from 25 to 800° C. in units of $10^{-7}$/° C. along the axial direction of inventive and comparative cordierite honeycombs having $d_{90}$ less than 33 µm and porosity<54%, plotted against the transverse I-ratio ($I_T$) of the same articles. Inventive articles (filled circles) exhibit "MT" values greater than 2660 and preferably MOR of 200/20 axial specimens greater than 850 psi, whereas comparative examples (open circles) have "$M_T$" values less than 2660 and generally have MOR of 200/20 axial specimens that are less than 850 psi. The diagonal line separating the two groups is given by the equation CTE=40.0−40.6($I_T$). It should be recognized that for a given CTE, the examples of the present invention have a higher degree of crystal orientation with c axes in the plane of the wall (higher $I_T$). A higher degree of orientation (higher $I_T$) alone would have the effect of lowering CTE. Because CTE is affected by both crystal orientation and microcracking, if an inventive article has the same CTE but a higher degree of orientation than a comparative article, then the inventive article has a lower amount of microcracking to offset the reduction in CTE that would otherwise occur due to better orientation. Thus, for a given transverse I-ratio ($I_T$), higher CTE implies less microcracking. Likewise, for a given CTE, higher transverse I-ratio ($I_T$) implies less microcracking. Less microcracking is desirable in that it produces an article having greater strength.

Figure 4:
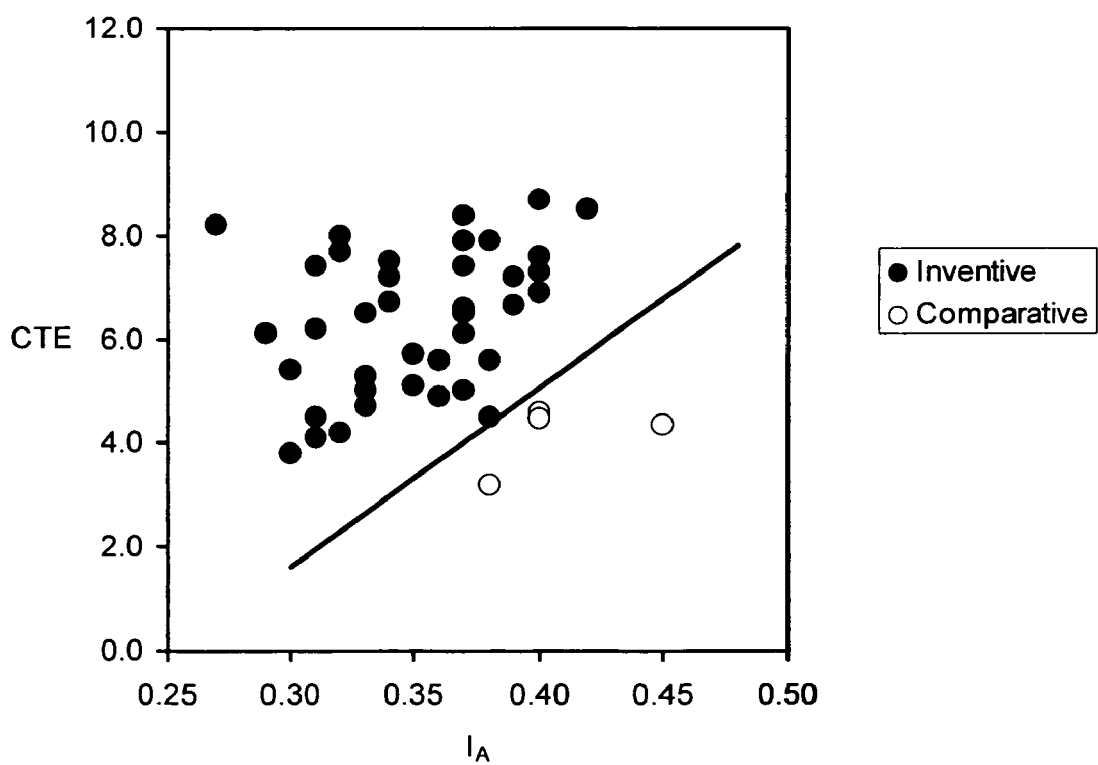
FIG. 4 shows CTE ($10^{-7}/°$ C.) versus the axial I-ratio, $I_A$ according to the invention.

FIG. 4 shows the mean CTE from 25 to 800° C. in units of $10^{-7}$/° C. along the axial direction of inventive and comparative cordierite honeycomb articles having a $d_{90}$ less than 33 microns and porosity<54%, plotted against the axial I-ratio ($I_A$) of the same articles. Inventive bodies (filled circles) have "$M_A$" values less than 2220 and preferably MOR of 200/20 axial specimens greater than 850 psi, whereas comparative examples (open circles) have "$M_A$" values greater than 2220 and preferably MOR of 200/20 axial specimens less than 850 psi. The diagonal line separating the two groups is given by the equation CTE=34.4 ($I_A$)−8.7. The examples of the present invention, at a given CTE, have a higher degree of crystal orientation with c axes in the plane of the wall, than those of the comparative examples, resulting in a lower $I_A$. For a given axial I-ratio, higher CTE implies less microcracking. For a given CTE, lower axial I-ratio implies less microcracking and, thus, higher strength.

Figure 5:
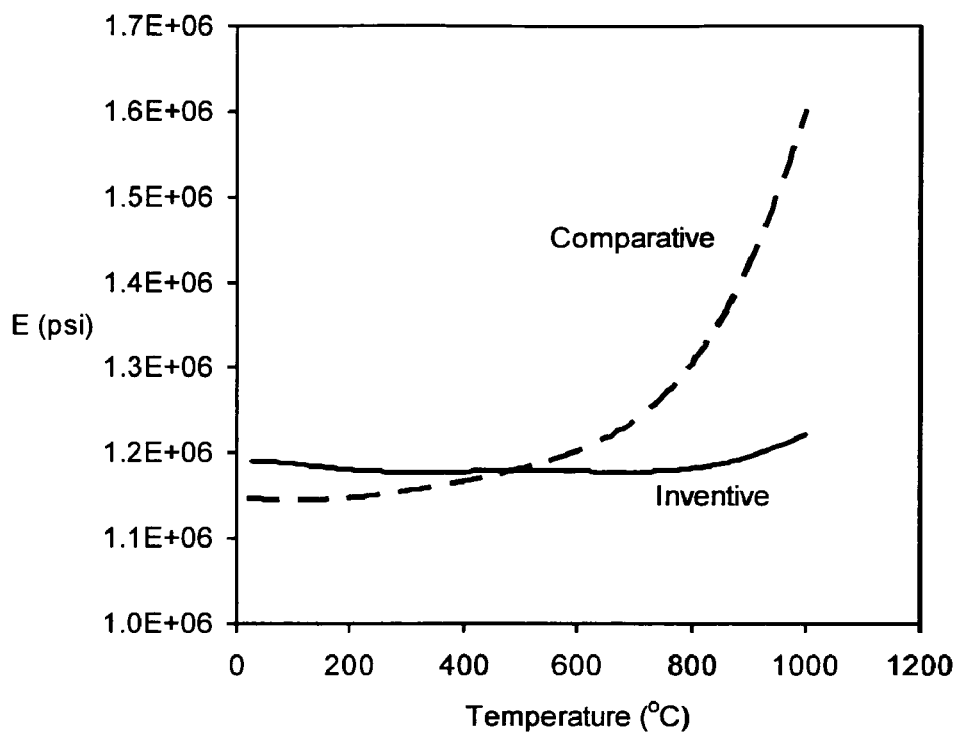
FIG. 5 depicts the elastic moduli (E) in psi as a function of increasing temperature for Inventive Example 7 and for Comparative Example C3.

FIG. 5 depicts the elastic modulus, E, in psi, of bars cut parallel to the direction of the channels from 200/20 specimens, measured by a sonic resonance technique, as a function of increasing temperature (in ° C.) for Inventive Example 7 (solid curve) and for Comparative Example C3 (dashed curve). The extent to which the elastic modulus, E, increases from 25 to 1000° C. is proportional to the amount of microcracking in the ceramic article. The smaller increase in elastic modulus, E, with temperature shows that Example 7 has a lower degree of microcracking than the comparative example. Accordingly, it has higher strength.

Figure 6:
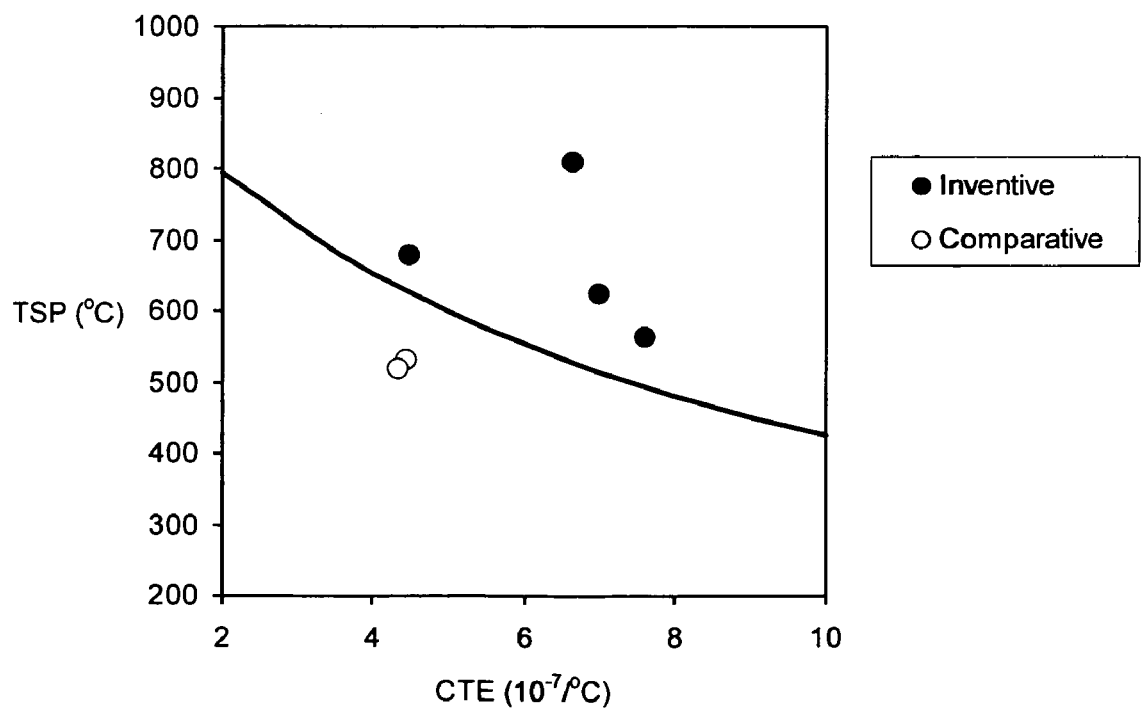
FIG. 6 is a plot of the computed thermal shock parameter, TSP (° C.) versus CTE ($10^{-7}/°$ C.) for examples made with no fine kaolin according to embodiments of the invention and comparative examples made with 16% fine kaolin.

FIG. 6 is a plot of the computed thermal shock parameter, TSP in ° C. versus the mean CTE, in $10^{-7}$/° C. from 25-800° C., for inventive examples made with no fine kaolin (filled circles), and comparative examples made with 16% fine kaolin (open circles). The thermal shock parameter (TSP) is defined in EQ. 4.

The TSP is a measure of the article's ability to resist damage (cracking) due to temperature gradients resulting from thermal cycling. A higher TSP is beneficial. This plot demonstrates that the absence of a fine kaolin source raises the thermal shock parameter, TSP, at a given CTE. Thus, such inventive examples having low amounts of fine kaolin will result in honeycomb articles having higher TSP for a given CTE, thereby providing better resistance to cracking when undergoing thermal cycling in use. The curve shown in FIG. 6 corresponds to the equation TSP=$7.3 \times 10^3$/[CTE(25-800° C.)+7.23], where CTE(25-800° C.) is in units of $10^{-7}$/° C. Inventive examples of the present invention honeycomb article preferably exhibit TSP values $\geq 7.3 \times 10^3$/[CTE(25-800° C.)+7.23].

Figure 7:
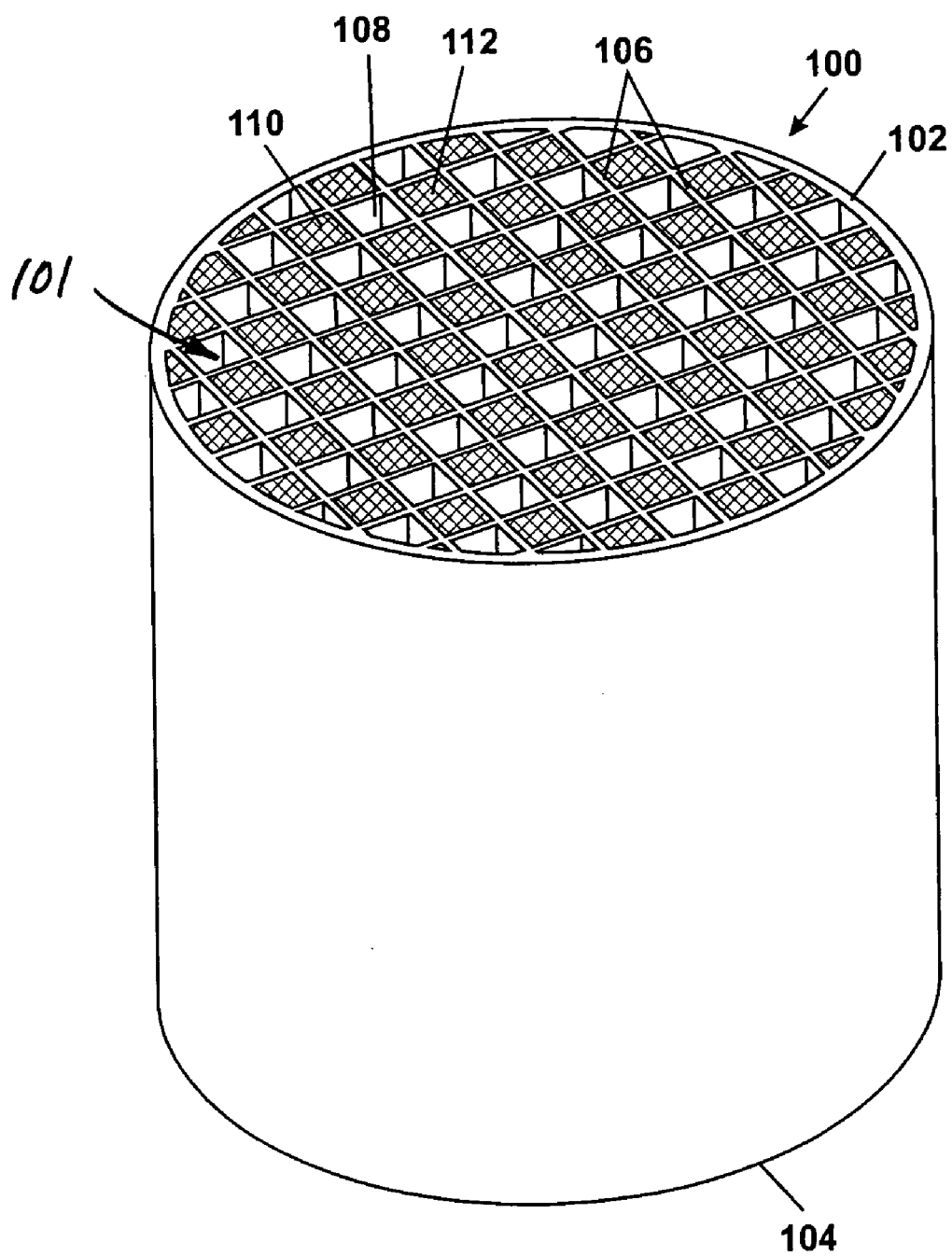
FIG. 7 is an isometric view of a honeycomb wall-flow particulate filter article according to an exemplary embodiment of the present invention.

FIG. 7 is a diagram of a honeycomb wall-flow particulate filter 100 formed of a honeycomb structure, according to the present invention. The honeycomb filter article 100 is composed of a body 101 having an inlet end 102, an outlet end 104, and a plurality of channels 108, 110 extending in parallel between the inlet end 102 and the outlet end 104. An alternating pattern of plugs 112 are arranged on inlet end 102 and outlet end 104 so that exhaust flows through the porous walls 106 of the channels 108, 110. The honeycomb filter article 100 may be formed of any channel density, typically 100-300 cells/in² (15.5-46.5 cells/cm²) and any wall thickness, typically 0.01 to 0.03 inch (254-762 µm), for example. For the purpose of this application the term honeycomb is intended to include materials having a generally honeycomb structure, but is not strictly limited to a hexagonal structure; for example triangular, square, rectangular, circular, combinations thereof or any other suitable channel shape may be used.

Figure 8:
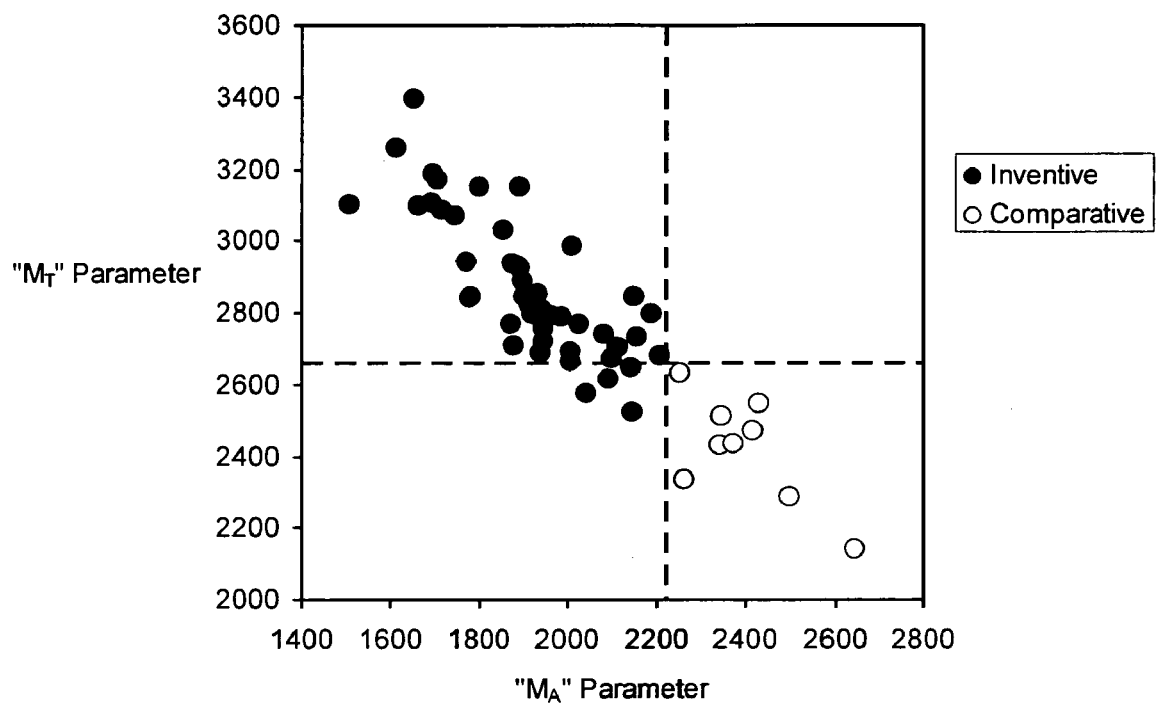
FIG. 8 is a plot of "$M_T$" Parameter versus "$M_A$" Parameter according to embodiments of the present invention.

FIG. 8 is a plot of the $M_T$ parameter versus the $M_A$ parameter for inventive examples made with not more than 8% fine kaolin or made with about 16% fine kaolin and fired at a heating rate of not more than 20° C./hr from 1200 to 1300° C., and comparative examples that either are made with at least 16% fine kaolin and fired at a heating rate of more than 20° C./hr from 1200 to 1300° C., or are made with no fine kaolin but which have an excessively coarse pore size or high porosity.

Figure 9:
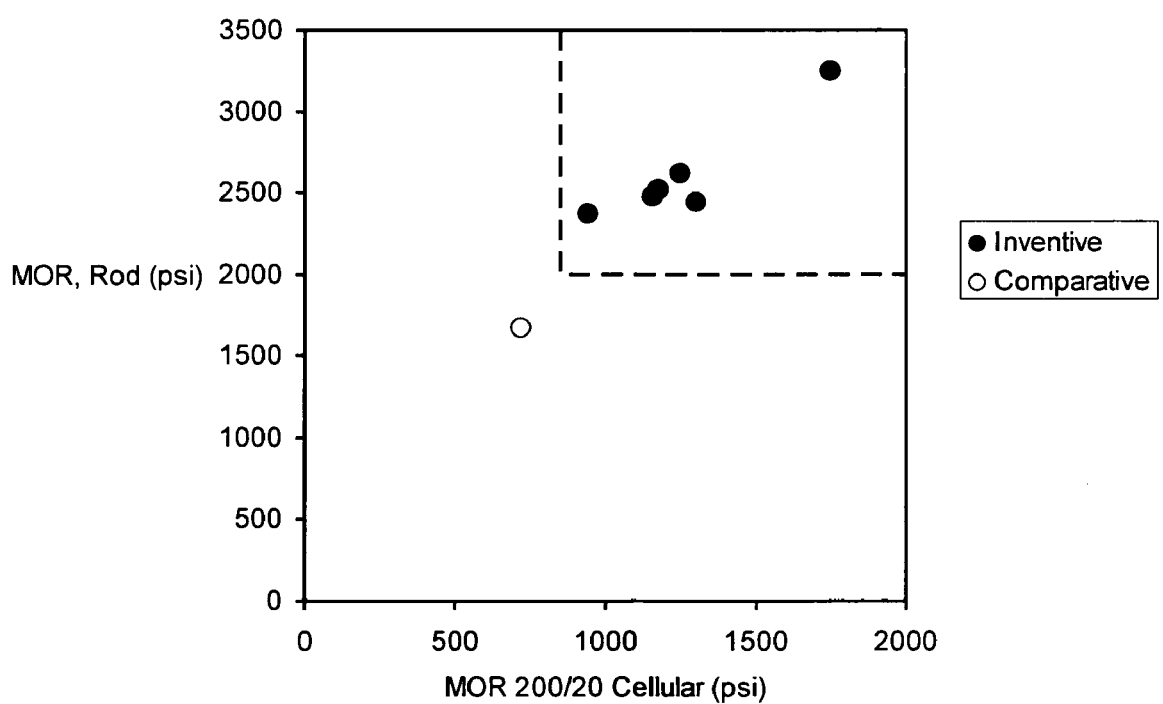
FIG. 9 is a plot of MOR of Cellular versus MOR of Noncellular Rod according to embodiments of the present invention.

FIG. 9 is a plot of the MOR (in psi) of the approximately 200/20 cellular specimens versus MOR (in psi) of the non-cellular rod, for inventive examples and comparative examples. As can be seen, both measures of strength are improved relative to the prior art. A higher MOR strength is beneficial because it helps with canning strength, general fatigue strength and resistance to cracking due to exposure to various vibrational environments.

The inventive porous cordierite ceramic honeycomb articles, as demonstrated in FIGS. 1-6, and 8-9, comprise $M_A$<2220, according to EQ. 1, or $M_T$>2660, according to EQ. 2, and also exhibit a mean CTE from 25 to 800° C. of not more than $9 \times 10^{-6}$/° C. in at least one direction. Such articles have improved strength while maintaining a high thermal shock resistance, and are especially advantageous for use as a honeycomb diesel particulate filter. According to certain embodiments of the invention, the cordierite honeycomb articles preferably exhibit a % porosity of at least 40%, but less than 54%, a median pore diameter, $d_{50}$>10 µm; and a mean CTE (25 to 800° C.)$\leq 9 \times 10^{-7}$/° C.; and which satisfy at least one of the following two relationships: $M_A$<2220, according to EQ. 1, or $M_T$>2660, according to EQ. 2. According to other embodiments of the invention, the median pore diameter is at least 13 µm for low pressure drop. Preferably the honeycomb article exhibits both $M_A$<2220 and $M_T$>2660, and in some embodiments both $M_A$<2000 and $M_T$>2800. Certain ones of these embodiments exhibit $M_A$<2000 or $M_T$>2900. Other preferred embodiments exhibit $M_A$<1800 or $M_T$>3000.

Values of $M_A$<2220 or $M_T$>2660 correspond to an MOR>850 psi for a 200/20 honeycomb article as shown in FIG. 1 and FIG. 2. It is recognized that a body satisfying $M_A$<2220 or $M_T$>2660 will have a higher MOR for any cell geometry than an article that does not satisfy $M_A$<2220 or $M_T$>2660 for that same cell geometry. Thus, the present invention is not limited by cell geometry, and pertains to all cordierite articles satisfying $M_A$<2220 or $M_T$>2660 regardless of cell shape, cell density, or wall thickness.

In a preferred embodiment, the present invention is a high-strength cordierite honeycomb article in which the mean coefficient of thermal expansion, CTE, in the axial direction from 25 to 800° C. in units of $10^{-7}$/° C. is greater than the quantity defined as [34.4 ($I_A$)−8.7], but CTE from 25 to 800° C. is still not more than $9 \times 10^{-7}$/° C.

Furthermore, in a preferred embodiment, the present invention is a high-strength cordierite honeycomb article in which the mean coefficient of thermal expansion, CTE, in the axial direction from 25 to 800° C. in units of $10^{-7}$/° C. is greater than the quantity defined as [40.0−40.6($I_T$)], but is still not more than $9 \times 10^{-7}$/° C. This restriction on CTE relative to the axial and transverse I-ratios ($I_A$ and $I_T$) ensures a relatively lower degree of microcracking, and improved MOR while maintaining a high thermal shock parameter, TSP. According to other embodiments of the invention, the CTE$\leq 8 \times 10^{-7}$/° C., and more preferably CTE$\leq 5 \times 10^{-7}$/° C.$^{-1}$. It is also preferred that $I_A$ is less than 0.40; more preferably not more than 0.35, or that the $I_T$ is greater than 0.86; more preferably at least 0.90.

The article has a median pore diameter, $d_{50}$, that is preferably greater than or equal to 10 µm for low clean pressure drop and preferably less than or equal to 25 µm for high filtration efficiency, i.e., 10 µm$\leq d_{50} \leq$25 µm. The value of $d_{50}$ is more preferably 12 µm$\leq d_{50} \leq$22 µm; and most preferably 14 µm$\leq d_{50} \leq$20 µm. The $d_{90}$ pore diameter of the honeycomb article is preferably made low by reducing the volume fraction of large pores wherein $d_{90} \leq$40 µm for higher strength; more preferably $d_{90} \leq$33 µm, more preferably yet $d_{90} \leq$30 µm; and in some embodiments $d_{90} \leq$25 µm. The pore distribution is also preferably narrow, as exhibited by a value of so-called "d-factor," $d_f$=($d_{50}$−$d_{10}$)/$d_{50}$ which is preferably $d_f \leq$0.60 for low soot-loaded pressure drop; and is more preferably $d_f \leq$0.50; and still more preferably $d_f \leq$0.40; and even more preferably $d_f \leq$0.36. This provides low overall soot-loaded pressure drop. It is especially preferred that $d_f \leq$0.40 and that the % porosity is greater than or equal to 48% and less than 54%.

Furthermore, it is preferred that the honeycomb exhibit a ratio, $E_R$, of the elastic modulus, E', at 1000° C. to the elastic modulus, E, at 25° C., i.e., E'(1000° C.)/E(25° C.), to be less than 1.20; and more preferably less than 1.10, as this also indicates a low degree of microcracking. Preferably, the honeycomb in a 200/20 cell geometry exhibits an elastic modulus at 25° C. of less than $1.3 \times 10^6$ psi; more preferably less than $1.2 \times 10^6$ psi. The above elastic moduli (E, E') are measured by sonic resonance.

Other preferred embodiments include cordierite honeycomb articles in which the ratio of MOR/E (strain-to-failure ratio) at about 25° C. is at least 0.073%; more preferably at least 0.080%; and still more preferably at least 0.090%. This results in articles which have higher resistance to cracking while undergoing thermal cycling.

It is also preferred that the article have a thermal shock parameter, TSP, defined in EQ. 4, which satisfies the relation TSP>$7.3 \times 10^{-3}$/[CTE(25-800° C.)+7.23] and in which CTE (25-800° C.) is in units of $10^{-7}/°$ C. Preferably, TSP$\geq$550° C.; more preferably TSP>700° C.; and in some embodiments TSP>800° C.

In one specific embodiment of the invention, the cordierite honeycomb article has an axial MOR that is greater than 850 psi when the bulk density of the body is 0.60 to 0.70 g/cm$^3$. These bulk densities are exhibited by articles with, for example, between about 45-52% porosity, a cell density of approximately 200 cells/inch$^2$, and a wall thickness of approximately 0.020 inches.

According to other preferred embodiments of the invention, excellent thermal shock resistance and strength are provided by honeycomb articles that exhibit $M_A$<1800 or $M_T$>3000, for example (See Tables 2-9). Furthermore, certain embodiments exhibit combinations of properties which exemplify articles having exceedingly good strength and thermal shock resistance. For example, such embodiments of the invention (See Tables 2-9) include the combination of % porosity$\leq$52%, $d_{90}\leq$29 µm, $I_A\leq$0.33, CTE$\leq$8×10$^{-7}/°$ C. (25-800° C.) in at least one direction, and $d_{50}\geq$10 µm.

Furthermore, certain honeycomb embodiments (See Tables 2-9) exhibit other combinations of properties which are desirable in particulate filters, such as % porosity of at least 44% and not more than 53%, 10 µm $\leq d_{50}\leq$20 µm, $d_{90}\leq$33 µm, $(d_{50}-d_{10})/d_{50}\leq$0.55, and CTE$\leq$8×10$^{-7}/°$ C. (25-800° C.) (or even CTE$\leq$6×10$^{-7}/°$ C.) in at least one direction. Such filter articles exhibit low clean and soot-loaded back pressure, as well as excellent strength and thermal shock resistance.

Other embodiments (See Tables 2-9) of the porous cordierite ceramic honeycomb article of the invention include % porosity of at least 46% and not more than 53%, 12 µm$\leq d_{50}\leq$19 µm, $d_{90}\leq$30 µm, $(d_{50}-d_{10})/d_{50}\leq$0.50, and CTE$\leq$8×10$^{-7}/°$ C. (25° C. to 800° C.) in at least one direction. Such embodiments exhibit good clean and soot loaded pressure drops, as well as good strength and thermal shock resistance. Certain of these embodiments exhibit very low d-factor, wherein $(d_{50}-d_{10})/d_{50}\leq$0.40 (See Tables 2-9) thus providing very low clean pressure drop.

The present invention also provides a method of manufacturing a high-strength cordierite-containing honeycomb article having a CTE of not more than 9×10$^{-7}/°$ C. and having $M_A$<2220 or $M_T$>2660 (preferably $M_A$<2220 and $M_T$>2660), and a batch therefor. The method involves mixing inorganic raw materials with processing aids and an optional pore former to form a plasticized batch mixture, forming the plasticized batch mixture into a honeycomb structure, and then firing the honeycomb structure to form the honeycomb article according to further embodiments of the invention. According to embodiments of the invention, only so much of the pore former is utilized to produce a fired honeycomb article having less than 54% porosity. Limiting porosity achieves higher strength.

The inorganic raw materials contain a talc (preferably a platy talc), an alumina-forming source, a silica-forming source, and 0-18% kaolin or calcined kaolin. Most importantly, the inorganic raw material mixture preferably includes little or no fine kaolin source (defined herein as having a median particle diameter of less than 7 µm). If a fine kaolin source is present, it is preferably present in an amount less than 8 wt. % of the batch inorganic materials; more preferably not more than 4 wt. %; and more preferably yet not more than 2 wt. %. In some embodiments, the batch is entirely absent of fine kaolin. In cases where the batch contains greater than 8% of a fine kaolin source, the average heating rate between 1200 and 1300° C. is not more than. 20° C./hr, and is preferably not more than 10° C./hr, and the weighted average median particle diameter of the alumina-forming sources is not less than 5 µm. The average heating rate between two temperatures is defined as the difference between the two temperatures divided by the time during which the kiln temperature is between those two temperatures. In some embodiments, the batch is entirely absent of any kaolin or calcined kaolin. All particle diameters herein are based upon a particle volume distribution as measured by laser diffraction on a suspension of the powders in a liquid, such as in water or isopropyl alcohol or a mixture thereof, using a particle size analyzer, such as a Model FRA9200 or Model S3000 Microtrac particle analyzer (products of Microtrac Inc.). The median particle diameter is thus the particle diameter at which 50% of the particles are of a smaller diameter, and 50% are of a larger diameter, based upon cumulative volume.

The alumina-forming source is preferably present in an amount of about 34 to 38 wt. %. The weighted average of the median particle diameters of the alumina-forming sources preferably is at least 5 µm, and in some embodiments at least 6 µm. The weighted average of the median particle diameters of the alumina-forming sources is defined as $$d_{50}(Al_2O_3 - \text{forming sources}) = \frac{(W_{Al-1})(d_{50,Al-1}) + (W_{Al-2})(d_{50,Al-2}) + \ldots + (W_{Al-n})(d_{50,Al-n})}{(W_{Al-1}) + (W_{Al-2}) + \ldots + (W_{Al-n})}$$

where W is the weight percentage of each alumina-forming source in the raw material mixture, $d_{50}$ is the median particle diameter of each alumina-forming source, and Al-1, Al-2, . . . Al-n represent each alumina-forming source used in the mixture. Alumina-forming sources are compounds capable of forming $Al_2O_3$ upon heating, and include, for example, corundum, a transition alumina such as gamma-alumina and rho-alumina, boehmite, diaspore, and gibbsite. In some preferred embodiments, the alumina-forming source includes, in part, a highly dispersible powder, such as boehmite, having a median particle diameter of less than 1 µm, preferably less than 0.5 µm, and more preferably less than 0.2 µm, which comprises not more than 10 wt. % of the inorganic raw materials.

The silica-forming source includes, but is not limited to, quartz, cristobalite, cryptocrystalline silica, non-crystalline silica such as fused silica, and diatomaceous silica, and combinations thereof. Quartz or cryptocrystalline silica are most preferred. The silica-forming source is preferably present in the amount of between 10 and 24 wt. % and preferably has a median particle diameter of at least 10 µm; and more preferably yet at least 20 microns. Most preferably the silica source has a median particle diameter of less than 35 µm.

The preferred talc has a median particle diameter greater than about 15 µm, and preferably greater than about 20 µm, but preferably has a median particle diameter less than 35 micrometers. The median particle diameter of the talc source or the silica-forming source is at least 7 µm. The talc is preferably provided in an amount of between 38 and 42 wt. % of the total inorganic materials. The talc preferably has an XRD talc morphology index of between 0.6 and 1.0, for example. The talc morphology index is more preferably at least 0.85. The value of the XRD talc morphology index can range from 0.0 to 1.0 and is proportional to the aspect ratio, or platy character, of the talc particles. Talc having a very platy morphology will have a high morphology index. The talc morphology index is measured by x-ray diffractometry on a talc powder that is packed into the x-ray diffraction sample holder to maximize the orientation of the talc within the plane of the sample holder, as described in U.S. Pat. No. 5,258,150. The XRD talc morphology index, M, is defined by the relationship:

$$M=I(004)/[I(004)+I(020)]$$

where I(004) and I(020) are the x-ray intensities of the (004) and (020) reflections as measured by Cu Kα radiation.

The raw material mixture further contains forming aids and may optionally contain a pore forming agent. The forming aids include a vehicle, such as water, a binder, such as a methylcellulose material, and a lubricant, such as sodium stearate. The pore forming agent, if provided, is only provided in an amount sufficient to ensure that the porosity of the fired honeycomb article is at least 40% and less than 54%. Pore forming agents in the amount of less than about 20% by wt. of the inorganic raw materials are required to meet this level of porosity. Preferred pore forming agents include graphite, potato starch, and polyethylene beads.

The dry ingredients are then mixed with the vehicle, such as with water, and kneaded in a preferably stainless steel muller or double-arm mixer or screw-type mixer, for example, to form an extrudable plastic batch mixture. The plastic batch mixture is then formed, preferably by extrusion, into a green body, as described in U.S. Pat. No. 5,205,991, for example. Upon being extruded, the cellular honeycomb green bodies are cut to a log length. Optionally, the honeycomb green bodies are dried in a suitable conventional RF or microwave dryer apparatus and then cut to a suitable final part length.

The honeycomb article is fired in a suitable furnace. The article is preferably fired at a top hold temperature between about 1390 to 1440° C. for 4 to 40 hours to form a body with a predominant phase of cordierite, preferably including at least 92% cordierite. More preferably, the article is formed by firing at between 1415 and 1435° C. for 12-35 hours.

When the raw material combination contains less than 8 wt. % of a fine kaolin source, the median particle diameter of the talc source is greater than 10 μm, and the median particle diameter of the silica source is finer than 8 μm, the heating rate from 1300 to 1390° C. should be not less than 20° C./hr, and when the median particle diameter of the talc source is less than 10 μm, the heating rate from 1300 to 1390° C. should be not less than 40° C./hr.

However, when the raw material combination contains greater than 8 wt. % of a fine kaolin source, the average heating rate from 1200 to 1300° C. should be not more than 20° C./hr; more preferably not more than 15° C./hr; and most preferably not more than 10° C./hr. When the median particle diameter of the talc source is greater than 10 μm and the median particle diameter of the silica source is finer than 8 μm, the heating rate from 1300 to 1390° C. should be not less than 20° C./hr, and when the median particle diameter of the talc source is less than 10 μm, the heating rate from 1300 to 1390° C. should be not less than 40° C./hr.

EXAMPLES

Raw materials used in the inventive examples are listed in Table 1, which provides the median particle diameter of the raw material powders as measured by laser diffraction using a Microtrac particle analyzer as described above. Inventive and comparative examples of 2-inch and 5.66-inch diameter extrusions having approximately 200 cells/inch$^2$ and approximately 0.020-inch walls are presented in Tables 2 to 18. All example batches were made with 4% to 6% methylcellulose binder, and 0.5 to 1% of a sodium stearate lubricant. In each of the Tables the batch materials are described in percent by weight solids without regard to liquid processing aids such as water and binder materials.

Some of the fired honeycomb bodies were plugged at the ends of alternate channels in a checkerboard pattern such that a channel that was plugged at one end was open at the other end, thereby forming a wall-flow filter. The pressure drop across the filter bodies was measured as follows. Each filter was wrapped in a ceramic fibrous mat and securely encased in a cylindrical metal holder. The holder and filter were attached at each end to metal pipes through which a stream of air was passed. The pressure drop across the filter, that is, the pressure difference between the inlet and outlet faces, was measured as a function of gas flow rate. Flow rates of 1.9 to 26.25 standard cubic feet per minute (scfm) were utilized for all 2-inch diameter samples, and flow rates of 15 to 210 scfm were used for the 5.66" diameter filters. A flow rate of 26.25 scfm through a 2-inch diameter filter is of approximately the same gas space velocity as a flow rate of 210 scfm through a 5.66-inch diameter filter of the same length, equal to 144,000 hr$^{-1}$ for a 6-inch long filter. The pressure drops for these samples, prior to the introduction of carbon particles into the filters, are referred to as the "clean" pressure drops, and these clean pressure drops increase with increasing flow rate. A clean pressure drop measured at 210 scfm through a 5.66×6 inch filter can be directly compared to the clean pressure drop measured at 26.25 scfm through a 2×6 inch filter because the gas space velocities are approximately equivalent.

After the clean pressure drops were measured, the samples were transferred to a second facility where they were again attached to a metal pipe into which a stream of air was passed. A very fine carbon soot was then aspirated into this air stream for a period of time, thereby partially loading the filter with carbon by coating the walls of the inlet channels with a layer of carbon particles. The sample was then taken back to the first apparatus and its pressure drop re-measured as a function of flow rate. This process was repeated for various increasing levels of carbon soot loading. Thus, pressure drops were determined as a function of flow rate and mass of carbon soot contained within the filter. In most cases, levels of carbon soot loading ranged from approximately 0.5 to 5 grams per liter of filter volume. Because the carbon soot was loaded at a lower flow rate on the 5.66-inch diameter filters than on the 2-inch diameter filters, soot-loaded pressure drops should only be compared among filters having the same diameter.

The conditions of the test method described above are meant to provide a relative comparison of the behaviors of the filters in environments of flowing gas and carbon soot build-up on the walls of the filter, analogous to the environment that a filter would experience if placed in the exhaust path of a diesel engine. To minimize reduction in engine performance, it is desired that the pressure drop of a filter that is loaded with a given mass per volume of carbon soot be as low as possible.

Tables 2 and 3 provide numerous examples of compositions used in the present invention article. All modulus of rupture (MOR) values of inventive examples are greater than 850 psi as measured on a cellular bar (1 inch×½ inch×5 inch long; 200 cells/in$^2$, 0.020 inch wall thickness). Examples 1-12 are substantially absent (free) of kaolin. Values of CTE, MOR, elastic modulus (E) at 25° C., elastic modulus (E') at 1000° C., % porosity, the pore diameters $d_1$, $d_5$, $d_{10}$, median pore size ($d_{50}$), $d_{90}$, $d_{95}$, and $d_{99}$, % mullite and % spinel in the fired body, and axial and transverse I ratios ($I_A$, $I_T$) are described. Furthermore, the values for CTE, % porosity, $d_{90}$ pore size, and the axial and transverse I-ratios ($I_A$, $I_T$) yield $M_T$ values greater than 2660, and $M_A$ values less than 2220. These results are shown with comparative examples in FIGS. 1, 2 and 8.

Also, the values for CTE−[40.0−40.6 ($I_T$)] and CTE−[34.4 ($I_A$)−8.7] are greater than zero, indicating a low degree of microcracking. These results are shown with comparative examples in FIGS. 3 and 4. As shown in FIG. 5, the elastic modulus, E, of an inventive example undergoes only a very small increase with temperature, so that the ratio E'(1000° C.)/E(25° C.) is preferably less than 1.20. A low ratio of E'(1000° C.)/E(25° C.) indicates a low degree of microcracking in the article. A low degree of microcracking equates to greater strength in the inventive honeycomb article.

Examples 5 and 7-9 show a high strain-to-failure as exemplified by a high (MOR/E) of greater than 0.073%; more preferably between 0.077% to 0.111%. Combined with the mean CTE' from 500-900° C. on heating, these strains-to-failure yield calculated thermal shock parameters, TSP, of greater than or equal to 550° C.; more preferably of between 563° C. and 808° C. These TSP values and those for comparative examples are plotted versus the mean CTE from 25 to 800° C. in FIG. 6. TSP is desirably as large as possible, while retaining the other desirable attributes, because it is an indicator of the honeycomb article's ability to withstand large differential temperatures encountered in use, such as during a regeneration cycle.

Tables 4, 8, and 9 provide examples of the present invention honeycomb article that contain kaolin (specifically Kaolin A and B). Examples 13-17 in Table 4 demonstrate that inventive properties can be obtained with as much as 16% of a coarse kaolin (Kaolin A). Examples 18 in Table 4 and Examples 39 to 42 in Table 8 show that the inventive articles are achieved with 6% or 8% of a fine kaolin source. Examples 43 to 48 in Table 9 demonstrate that inventive properties may be obtained with up to 16% of a fine kaolin source (Kaolin B), but only when the average heating rate from 1200 to 1300° C. is not more than 20° C./hr. Values for CTE−[40.0−40.6($I_T$)] and CTE−[$^{34.4}$($I_A$)−8.7] are also all positive for these inventive kaolin-containing examples, indicating a low degree of microcracking and, hence, a high degree of strength greater than 850 psi for a 200/20 cellular specimen.

Tables 10 to 15 provide additional details of the pore size distributions for inventive examples from the Tables. These values are derived from the mercury porosimetry measurements obtained for each example. Included are the total pore volume, TPV, equivalent to the total mercury intrusion volume, in units of cm$^3$/g, and the percentages of the total pore volume comprised of pores with diameters finer than 1, 2, 3, 4, 5, 6, 10, 15, 20, 25, 30, 40, 50, 60, 70, 80, 90, and 100 μm. The percentage of the TPV greater than a given pore diameter may be computed by subtracting the value in the Table from 100. The percentage of the TPV lying between any two limiting pore diameters may be computed by taking the difference between the percent values for those two pore diameters in the Table.

Tables 16 and 17 demonstrate that when about 16% fine kaolin, having a median particle diameter less than 7 μm, is present in the raw material mixture and the heating rate from 1200 to 1300° C. is greater than 20° C./hr, the MOR of a 200/20 cellular specimen is less than 850 psi and the $M_A$ and $M_T$ values lie outside the range of the invention. This demonstrates the importance of minimizing the use of fine kaolin in the batch or maintaining a slow average heating rate (less than 20° C./hr) between 1200 and 1300° C. This is a consequence of the excessive microcracking associated with batches made with more than 8% fine kaolin and 1200-1300° C. heating rates faster than 20° C./hr, as seen in the negative values of CTE−[40.0−40.6($I_T$)] and CTE−[34.4($I_A$)−8.7], and the higher E ratios of E'(1000° C.)/E(25° C.) ranging from 1.35 to 1.39. The elastic modulus versus temperature curve for Example C4 is shown in FIG. 5. The steep increase in elastic modulus with temperature is due to the higher degree of microcracking in the comparative bodies made with 16% of a kaolin having a median particle diameter less than 7 μm and a 1200-1300° C. heating rate of more than 20° C./hr. The comparative samples made with 16% fine kaolin also possess lower strains-to-failure, MOR/E, i.e., less than 0.073%, than those made without kaolin. This results in lower values for the thermal shock parameter, as shown in FIG. 6.

Table 18 provides comparative examples made without fine kaolin in the raw material mixture, but for which the values of $M_A$ and $M_T$ lie outside the range of the present invention due to an excessively large value of $d_{90}$>40 μm (Examples C14 to C16) or due to a high porosity>54% (Examples C16 to C19).

TABLE 1

| Raw Material | Median Particle Diameter by Laser Diffraction (μm) | XRD Talc Morphology Index |
|---|---|---|
| Talc A | 28 | 0.94 |
| Talc B | 24 | 0.94 |
| Talc C | 15 | 0.65 |
| Talc D | Approx. 40 | 0.95 |
| Talc E | Approx. 30 | 0.95 |
| Talc F | Approx. 20 | 0.65 |
| Talc G | 5.0 | 0.88 |
| Talc H | 8.6 | 0.94 |
| Quartz A | 25 | — |
| Quartz B | 23 | — |
| Quartz C | 4.1 | — |
| Quartz D | 20 | — |
| Quartz E | 100 | — |
| Fused Silica | 46 | — |
| Alumina A | 9.0 | — |
| Alumina B | 6.6 | — |
| Alumina C | 3.0 | — |
| Alumina D | 0.6 | — |
| Boehmite | Dispersible to <0.2 | — |
| Al(OH)$_3$ A | 21 | — |
| Al(OH)$_3$ B | 13 | — |
| Al(OH)$_3$ C | 12 | — |
| Al(OH)$_3$ D | 5.0 | — |
| Kaolin A | 11 | — |
| Kaolin B | 3.9 | — |
| Graphite A | 124 | — |
| Graphite B | 35 | — |
| Graphite C | 101 | — |
| Graphite D | 39 | — |
| Graphite E | 29 | — |
| Graphite F | 49 | — |
| Potato Starch | 49 | — |
| Polyethylene Beads | 14 | — |

TABLE 2

Inventive Examples 1-6

| | Example Number | | | | | |
|---|---|---|---|---|---|---|
| | 1 | 2 | 3 | 4 | 5 | 6 |
| Maximum Temperature (° C.) | 1425 | 1425 | 1425 | 1425 | 1430 | 1425 |
| Hold Time (hours) | 15 | 15 | 15 | 15 | 30 | 15 |
| Heating Rate 1150-1200° C. (° C./h) | 25 | 25 | 25 | 25 | 20 | 25 |
| Heating Rate 1200-1300° C. (° C./h) | 25 | 25 | 25 | 25 | 50 | 25 |
| Heating Rate 1300-1360° C. (° C./h) | 25 | 25 | 25 | 25 | 50 | 25 |
| Heating Rate 1360-Max. Temp. (° C./h) | 6 | 6 | 6 | 5 | 50 | 5 |
| Raw Materials | | | | | | |
| Talc B | 40.38 | 40.38 | 39.96 | 40.38 | 40.38 | 39.96 |
| Quartz A | 0 | 0 | 0 | 22.39 | 22.39 | 22.15 |
| Quartz B | 22.39 | 22.39 | 22.15 | 0 | 0 | 0 |
| Alumina B | 21.77 | 21.77 | 21.54 | 21.77 | 21.77 | 21.54 |
| Boehmite | 5.05 | 5.05 | 0 | 5.05 | 5.05 | 0 |
| Al(OH)$_3$ D | 10.31 | 10.31 | 16.35 | 10.31 | 10.31 | 16.35 |
| Kaolin A | 0 | 0 | 0 | 0 | 0 | 0 |
| Kaolin B | 0 | 0 | 0 | 0 | 0 | 0 |
| Graphite B | 0 | 10.00 | 10.00 | 0 | 0 | 10.00 |
| Potato Starch | 0 | 0 | 0 | 0 | 10.00 | 0 |
| Properties | | | | | | |
| CTE, 25-800 C. ($10^{-7}$° C.$^{-1}$) | 4.2 | 7.7 | 8.0 | 5.3 | 6.7 | 6.2 |
| CTE, 500-900° C. ($10^{-7}$° C.$^{-1}$) | 11.8 | 14.7 | 15.1 | 12.1 | 14.0 | 13.1 |
| Modulus of Rupture, Cellular (psi) | 1745 | 1620 | 1556 | 1113 | 1090 | 1047 |
| Modulus of Rupture, Rod (psi) | 3247 | — | — | — | — | — |
| Elastic Modulus at 25° C. ($10^6$ psi) | — | — | — | — | 0.98 | — |
| Elastic Modulus at 1000° C. ($10^6$ psi) | — | — | — | — | — | — |
| E(1000° C.)/E(25° C.) | — | — | — | — | — | — |
| MOR/E (%) | — | — | — | — | 0.111 | — |
| Thermal Shock Parameter (° C.) | — | — | — | — | 808 | — |
| % Porosity | 45.5 | 51.1 | 51.5 | 45.8 | 53.1 | 50.8 |
| $d_1$ | 2.5 | 3.8 | 4.9 | 3.2 | 6.5 | 3.2 |
| $d_5$ | 4.5 | 6.0 | 7.9 | 4.7 | 10.1 | 5.0 |
| $d_{10}$ | 5.8 | 7.3 | 9.4 | 5.9 | 12.2 | 6.2 |
| $d_{50}$ | 12.0 | 13.6 | 15.3 | 11.6 | 19.5 | 11.7 |
| $d_{90}$ | 23.1 | 23.3 | 28.9 | 24.7 | 29.9 | 22.9 |
| $d_{95}$ | 39.0 | 38.1 | 56.0 | 40.2 | 44.5 | 38.9 |
| $d_{99}$ | 142 | 177 | 233 | 165 | 162 | 146 |
| $(d_{50} - d_{10})/d_{50}$ | 0.52 | 0.46 | 0.38 | 0.49 | 0.37 | 0.47 |
| $(d_{90} - d_{10})/d_{50}$ | 1.44 | 1.17 | 1.27 | 1.72 | 0.94 | 1.46 |
| % Mullite | 1.1 | 0.9 | 0.9 | 0 | 0.7 | 0.6 |
| % Spinel | 2.0 | 1.9 | 2.8 | 2.9 | 2.0 | 2.9 |
| Axial I-Ratio, $I_A$ | 0.32 | 0.32 | 0.32 | 0.33 | 0.39 | 0.31 |
| Transverse I-Ratio, $I_T$ | 0.90 | 0.90 | 0.92 | 0.90 | 0.91 | 0.90 |
| CTE - [34.4($I_A$)-8.7] | 1.9 | 5.4 | 5.7 | 2.6 | 1.9 | 4.2 |
| CTE - [40.0-40.6($I_T$)] | 0.7 | 4.2 | 5.4 | 1.8 | 3.6 | 2.7 |
| $M_A$ | 1933 | 1661 | 1743 | 1889 | 2187 | 1772 |
| $M_T$ | 2853 | 3097 | 3069 | 2930 | 2795 | 2940 |
| Filter Diameter (inches) | 2.0 | 2.0 | 2.0 | 5.66 | 5.66 | 5.66 |
| Clean Pressure Drop (kPa) | 3.0 | 3.2 | 2.1 | 2.4 | 2.0 | 2.2 |
| Pressure Drop at 5 g/l soot (kPa) | 8.9 | 7.9 | 5.5 | 8.9 | 7.0 | 7.3 |
| Cell Density (cells/inch$^2$) | 199 | 199 | 204 | 196 | 191 | 192 |
| Wall Thickness ($10^{-3}$ inches) | 20.8 | 21.0 | 19.5 | 19.9 | 20.0 | 20.0 |

TABLE 3

Inventive Examples 7-12

| | Example Number | | | | | |
|---|---|---|---|---|---|---|
| | 7 | 8 | 9 | 10 | 11 | 12 |
| Maximum Temperature (° C.) | 1425 | 1430 | 1430 | 1425 | 1425 | 1430 |
| Hold Time (hours) | 15 | 30 | 30 | 15 | 15 | 10 |
| Heating Rate 1150-1200° C. (° C./h) | 25 | 75 | 75 | 25 | 25 | 20 |
| Heating Rate 1200-1300° C. (° C./h) | 25 | 75 | 75 | 25 | 25 | 50 |
| Heating Rate 1300-1360° C. (° C./h) | 25 | 75 | 75 | 25 | 25 | 50 |
| Heating Rate 1360-Max. Temp. (° C./h) | 6 | 6 | 6 | 6 | 6 | 50 |
| Raw Materials | | | | | | |
| Talc A | 0 | 40.38 | 0 | 40.38 | 40.38 | 0 |

TABLE 3-continued

Inventive Examples 7-12

| | Example Number | | | | | |
|---|---|---|---|---|---|---|
| | 7 | 8 | 9 | 10 | 11 | 12 |
| Talc B | 39.96 | 0 | 40.38 | 0 | 0 | 40.38 |
| Quartz A | 0 | 22.39 | 17.39 | 22.39 | 22.39 | 17.39 |
| Quartz B | 22.15 | 0 | 0 | 0 | 0 | 0 |
| Quartz C | 0 | 0 | 5.00 | 0 | 0 | 5.00 |
| Alumina B | 21.54 | 21.77 | 21.77 | 21.77 | 21.77 | 21.77 |
| Boehmite | 0 | 5.05 | 5.05 | 5.05 | 5.05 | 5.05 |
| Al(OH)$_3$ D | 16.35 | 10.31 | 10.31 | 10.31 | 10.31 | 10.31 |
| Kaolin A | 0 | 0 | 0 | 0 | 0 | 0 |
| Kaolin B | 0 | 0 | 0 | 0 | 0 | 0 |
| Graphite B | 10.00 | 0 | 0 | 0 | 0 | 0 |
| Polyethylene Beads | 0 | 5.00 | 0 | 5.00 | 0 | 0 |
| Potato Starch | 0 | 0 | 10.00 | 0 | 0 | 10.00 |
| Properties | | | | | | |
| CTE, 25-800 C. ($10^{-7}$ °C.$^{-1}$) | 7.0 | 4.5 | 7.6 | 7.9 | 6.1 | 7.3 |
| CTE, 500-900° C. ($10^{-7}$ °C.$^{-1}$) | 14.4 | 11.6 | 15.4 | 14.5 | 13.6 | 14.5 |
| Modulus of Rupture, Cellular (psi) | 1046 | 974 | 904 | 892 | 880 | 879 |
| Elastic Modulus at 25° C. ($10^6$ psi) | 1.19 | 1.26 | 1.09 | — | — | — |
| Elastic Modulus at 1000° C. ($10^6$ psi) | 1.22 | — | — | — | — | — |
| E(1000° C.)/E(25° C.) | 1.03 | — | — | — | — | — |
| MOR/E (%) | 0.088 | 0.077 | 0.083 | — | — | — |
| Thermal Shock Parameter (° C.) | 624 | 678 | 563 | — | — | — |
| % Porosity | 51.0 | 44.7 | 47.9 | 47.0 | 45.1 | 50.9 |
| $d_1$ | 8.0 | 3.6 | 7.0 | 7.2 | 7.5 | 7.9 |
| $d_5$ | 10.0 | 6.0 | 8.8 | 9.0 | 9.9 | 10.8 |
| $d_{10}$ | 11.4 | 7.2 | 10.0 | 10.4 | 11.6 | 12.8 |
| $d_{50}$ | 17.8 | 13.1 | 14.9 | 17.2 | 19.0 | 20.6 |
| $d_{90}$ | 29.7 | 28.4 | 22.5 | 32.8 | 37.7 | 31.5 |
| $d_{95}$ | 48.1 | 46.4 | 37.8 | 48.7 | 59.0 | 47.1 |
| $d_{99}$ | 170 | 144 | 181 | 116 | 170 | 150 |
| $(d_{50} - d_{10})/d_{50}$ | 0.36 | 0.45 | 0.33 | 0.39 | 0.39 | 0.38 |
| $(d_{90} - d_{10})/d_{50}$ | 1.03 | 1.52 | 0.88 | 1.40 | 1.55 | 0.95 |
| % Mullite | — | 0 | 1.1 | 1.0 | 1.4 | 1.0 |
| % Spinel | — | 3.2 | 3.7 | 2.7 | 3.5 | 1.9 |
| Axial I-Ratio, $I_A$ | — | 0.38 | 0.40 | 0.39 | 0.35 | 0.40 |
| Transverse I-Ratio, $I_T$ | — | 0.88 | 0.89 | 0.90 | 0.90 | 0.90 |
| CTE - [34.4($I_A$)-8.7] | — | 0.1 | 2.5 | 3.1 | 2.8 | 2.2 |
| CTE - [40.0-40.6($I_T$)] | — | 0.2 | 3.7 | 4.4 | 2.6 | 3.8 |
| $M_A$ | — | 2207 | 1894 | 2010 | 2112 | 2147 |
| $M_T$ | — | 2678 | 3149 | 2984 | 2705 | 2843 |
| Filter Diameter (inches) | 5.66 | — | 5.66 | — | 5.66 | 5.66 |
| Clean Pressure Drop (kPa) | 2.1 | — | 2.2 | — | 2.0 | 1.9 |
| Pressure Drop at 5 g/l soot (kPa) | 6.3 | — | 7.6 | — | 9.7 | 6.2 |
| Cell Density (cells/inch$^2$) | 175 | — | 200 | — | 196 | 189 |
| Wall Thickness ($10^{-3}$ inches) | 20.0 | — | 19.3 | — | 19.7 | 19.7 |

TABLE 4

Inventive Examples 13-18

| | Example Number | | | | | |
|---|---|---|---|---|---|---|
| | 13 | 14 | 15 | 16 | 17 | 18 |
| Maximum Temperature (° C.) | 1425 | 1425 | 1425 | 1425 | 1425 | 1425 |
| Hold Time (hours) | 15 | 15 | 15 | 15 | 15 | 15 |
| Heating Rate 1150-1200° C. (° C./h) | 25 | 25 | 25 | 100 | 25 | 25 |
| Heating Rate 1200-1300° C. (° C./h) | 25 | 25 | 25 | 100 | 25 | 25 |
| Heating Rate 1300-1360° C. (° C./h) | 25 | 25 | 25 | 100 | 25 | 25 |
| Heating Rate 1360-Max. Temp. (° C./h) | 6 | 6 | 6 | 100 | 6 | 6 |
| Raw Materials | | | | | | |
| Talc B | 39.01 | 39.01 | 41.30 | 41.30 | 40.10 | 41.16 |
| Talc C | 0 | 0 | 0 | 0 | 0 | 0 |
| Quartz A | 18.09 | 18.09 | 19.15 | 19.15 | 12.32 | 0 |
| Quartz B | 0 | 0 | 0 | 0 | 0 | 16.40 |
| Quartz C | 0 | 0 | 0 | 0 | 0 | 0 |
| Alumina A | 12.19 | 0 | 0 | 0 | 8.67 | 0 |
| Alumina B | 0 | 12.19 | 24.03 | 24.03 | 0 | 18.17 |
| Boehmite | 7.06 | 7.06 | 7.47 | 7.47 | 7.39 | 0 |

TABLE 4-continued

Inventive Examples 13-18

| | \multicolumn{6}{c}{Example Number} | | | | | |
|---|---|---|---|---|---|---|
| | 13 | 14 | 15 | 16 | 17 | 18 |
| Al(OH)$_3$ A | 0 | 0 | 0 | 0 | 15.76 | 0 |
| Al(OH)$_3$ B | 0 | 0 | 0 | 0 | 0 | 16.18 |
| Al(OH)$_3$ D | 16.06 | 16.06 | 0 | 0 | 0 | 0 |
| Kaolin A | 7.59 | 7.59 | 8.04 | 8.04 | 15.76 | 0 |
| Kaolin B | 0 | 0 | 0 | 0 | 0 | 8.09 |
| Properties | | | | | | |
| CTE, 25-800 C. ($10^{-7}$ °C.$^{-1}$) | 4.5 | 4.1 | 4.9 | 7.4 | 5.0 | 8.5 |
| CTE, 500-900° C. ($10^{-7}$ °C.$^{-1}$) | 11.5 | 11.3 | 12.3 | — | 12.3 | 15.8 |
| Modulus of Rupture, Cellular (psi) | 1303 | 1147 | 1161 | 1938 | 942 | 1179 |
| Modulus of Rupture, Rod (psi) | 2440 | — | 2475 | — | 2365 | 2521 |
| % Porosity | 46.3 | 44.7 | 44.3 | 43.6 | 44.8 | 46.4 |
| $d_1$ | 2.9 | 2.5 | 2.1 | 3.6 | 1.4 | 1.4 |
| $d_5$ | 4.8 | 4.1 | 4.2 | 5.9 | 6.2 | 4.6 |
| $d_{10}$ | 6.2 | 5.4 | 5.7 | 8.0 | 7.8 | 6.4 |
| $d_{50}$ | 12.9 | 10.9 | 12.3 | 15.8 | 15.5 | 13.5 |
| $d_{90}$ | 26.0 | 22.2 | 25.3 | 29.0 | 30.3 | 25.4 |
| $d_{95}$ | 49.4 | 45.2 | 49.6 | 48.0 | 51.8 | 45.4 |
| $d_{99}$ | 203 | 199 | 245 | 191 | 178 | 187 |
| $(d_{50} - d_{10})/d_{50}$ | 0.52 | 0.51 | 0.54 | 0.50 | 0.50 | 0.53 |
| $(d_{90} - d_{10})/d_{50}$ | 1.53 | 1.54 | 1.59 | 1.33 | 1.46 | 1.41 |
| % Mullite | 1.7 | 0.8 | 1.2 | 1.7 | 0 | 1.4 |
| % Spinel | 2.5 | 5.0 | 2.2 | 2.0 | 3.2 | 2.3 |
| Axial I-Ratio, $I_A$ | 0.31 | 0.31 | 0.36 | 0.37 | 0.37 | 0.42 |
| Transverse I-Ratio, $I_T$ | 0.90 | 0.91 | 0.87 | 0.88 | 0.89 | 0.82 |
| CTE - [34.4($I_A$)-8.7] | 2.5 | 2.1 | 1.2 | 3.1 | 1.0 | 2.8 |
| CTE - [40.0-40.6($I_T$)] | 1.0 | 1.0 | 0.2 | 3.4 | 1.1 | 1.8 |
| $M_A$ | 1935 | 1876 | 2027 | 1856 | 2154 | 1901 |
| $M_T$ | 2788 | 2935 | 2768 | 3031 | 2733 | 2890 |
| Filter Diameter (inches) | 2.0 | 2.0 | 2.0 | — | 2.0 | 2.0 |
| Clean Pressure Drop (kPa) | 3.2 | 3.6 | 3.1 | — | 3.0 | 2.7 |
| Pressure Drop at 5 g/l soot (kPa) | 10.4 | 11.1 | 10.4 | — | 10.2 | 8.5 |
| Cell Density (cells/inch$^2$) | 205 | 206 | 196 | — | 203 | 197 |
| Wall Thickness ($10^{-3}$ inches) | 20.6 | 20.6 | 20.9 | — | 20.7 | 21.8 |

TABLE 5

Inventive Examples 19-25

| | \multicolumn{7}{c}{Example Number} | | | | | | |
|---|---|---|---|---|---|---|---|
| | 19 | 20 | 21 | 22 | 23 | 24 | 25 |
| Maximum Temperature (° C.) | 1425 | 1425 | 1425 | 1425 | 1425 | 1425 | 1425 |
| Hold Time (hours) | 30 | 15 | 30 | 15 | 30 | 30 | 22.5 |
| Heating Rate 1160-1200° C. (° C./h) | 100 | 6 | 6 | 100 | 6 | 100 | 25 |
| Heating Rate 1200-1300° C. (° C./h) | 100 | 6 | 6 | 100 | 6 | 100 | 25 |
| Heating Rate 1300-1360° C. (° C./h) | 6 | 100 | 6 | 6 | 100 | 100 | 25 |
| Heating Rate 1360-1425° C. (° C./h) | 6 | 100 | 6 | 6 | 100 | 100 | 25 |
| Raw Materials | | | | | | | |
| Talc B | 39.96 | 39.96 | 39.96 | 39.96 | 39.96 | 39.96 | 39.96 |
| Quartz B | 22.15 | 22.15 | 22.15 | 22.15 | 22.15 | 22.15 | 22.15 |
| Alumina B | 21.54 | 21.54 | 21.54 | 21.54 | 21.54 | 21.54 | 21.54 |
| Al(OH)$_3$ D | 16.35 | 16.35 | 16.35 | 16.35 | 16.35 | 16.35 | 16.35 |
| Kaolin A | 0 | 0 | 0 | 0 | 0 | 0 | 0 |
| Kaolin B | 0 | 0 | 0 | 0 | 0 | 0 | 0 |
| Graphite B | 10.00 | 10.00 | 10.00 | 10.00 | 10.00 | 10.00 | 10.00 |
| Properties | | | | | | | |
| CTE, 25-800 C. ($10^{-7}$ °C.$^{-1}$) | 4.7 | 8.2 | 5.4 | 5.7 | 7.5 | 7.1 | 6.1 |
| CTE, 500-900° C. ($10^{-7}$ °C.$^{-1}$) | — | — | — | — | — | — | — |
| Modulus of Rupture, Cellular (psi) | — | — | — | — | — | — | — |
| Modulus of Rupture, Rod (psi) | — | — | — | — | — | — | — |
| % Porosity | 46.8 | 49.2 | 48.8 | 46.4 | 50.5 | 48.8 | 50.8 |
| $d_1$ | 6.1 | 5.2 | 4.2 | 6.6 | 4.0 | 4.7 | 6.5 |
| $d_5$ | 7.7 | 6.9 | 6.2 | 8.5 | 7.2 | 13.2 | 8.7 |
| $d_{10}$ | 9.1 | 8.2 | 7.6 | 9.6 | 9.1 | 15.5 | 10.1 |
| $d_{50}$ | 15.4 | 15.6 | 14.9 | 14.9 | 18.6 | 22.5 | 17.5 |
| $d_{90}$ | 26.5 | 29.2 | 29.7 | 27.7 | 36.2 | 39.8 | 36.6 |

TABLE 5-continued

Inventive Examples 19-25

| | Example Number | | | | | | |
|---|---|---|---|---|---|---|---|
| | 19 | 20 | 21 | 22 | 23 | 24 | 25 |
| $d_{95}$ | 40.4 | 49.8 | 50.2 | 48.1 | 54.2 | 69.5 | 64.5 |
| $d_{99}$ | 167 | 187 | 177 | 156 | 143 | 206 | 239 |
| $(d_{50} - d_{10})/d_{50}$ | 0.41 | 0.47 | 0.49 | 0.36 | 0.51 | 0.31 | 0.43 |
| $(d_{90} - d_{10})/d_{50}$ | 1.13 | 1.35 | 1.48 | 1.21 | 1.46 | 1.08 | 1.51 |
| % Mullite | 0.6 | 0.7 | 0 | 0.7 | 0.9 | 0 | 0.6 |
| % Spinel | 3.4 | 4.2 | 1.6 | 4.1 | 2.4 | 3.7 | 2.4 |
| Axial I-Ratio, $I_A$ | 0.33 | 0.27 | 0.30 | 0.35 | 0.31 | 0.36 | 0.31 |
| Transverse I-Ratio, $I_T$ | 0.88 | 0.91 | 0.92 | 0.88 | 0.89 | 0.87 | 0.90 |
| CTE - [34.4($I_A$)-8.7] | 2.0 | 7.6 | 3.8 | 2.4 | 5.5 | 3.4 | 4.1 |
| CTE - [40.0-40.6($I_T$)] | 0.4 | 5.1 | 2.8 | 1.4 | 3.6 | 2.4 | 2.6 |
| $M_A$ | 2004 | 1507 | 1914 | 1986 | 1881 | 2144 | 2041 |
| $M_T$ | 2691 | 3100 | 2824 | 2789 | 2708 | 2523 | 2575 |
| Filter Diameter (inches) | 2 | 2 | 2 | 2 | 2 | 2 | 2 |
| Clean Pressure Drop (kPa) | 3.1 | — | — | — | — | — | — |
| Pressure Drop at 5 g/l soot (kPa) | 8.5 | 7.1 | 8.8 | 8.7 | 7.5 | 7.0 | 7.5 |
| Cell Density (cells/inch$^2$) | 202 | 196 | 196 | 208 | 203 | 196 | 205 |
| Wall Thickness ($10^{-3}$ inches) | 19.7 | 21.0 | 20.0 | 20.9 | 20.1 | 19.4 | 20.7 |

TABLE 6

Inventive Examples 26-30

| | Example Number | | | | |
|---|---|---|---|---|---|
| | 26 | 27 | 28 | 29 | 30 |
| Maximum Temperature (° C.) | 1425 | 1425 | 1425 | 1425 | 1425 |
| Hold Time (hours) | 30 | 22.5 | 22.5 | 30 | 22.5 |
| Heating Rate 1160-1200° C. (° C./h) | 6 | 47 | 25 | 100 | 25 |
| Heating Rate 1200-1300° C. (° C./h) | 6 | 47 | 25 | 100 | 25 |
| Heating Rate 1300-1360° C. (° C./h) | 100 | 47 | 25 | 6 | 25 |
| Heating Rate 1360-1425° C. (° C./h) | 100 | 47 | 25 | 6 | 25 |
| Raw Materials | | | | | |
| Talc B | 39.96 | 39.96 | 39.96 | 39.96 | 39.96 |
| Quartz B | 22.15 | 22.15 | 22.15 | 22.15 | 22.15 |
| Alumina B | 21.54 | 21.54 | 21.54 | 21.54 | 21.54 |
| Al(OH)$_3$ B | 0 | 0 | 0 | 16.35 | 16.35 |
| Al(OH)$_3$ D | 16.35 | 16.35 | 16.35 | 0 | 0 |
| Kaolin A | 0 | 0 | 0 | 0 | 0 |
| Kaolin B | 0 | 0 | 0 | 0 | 0 |
| Properties | | | | | |
| CTE, 25-800 C. ($10^{-7}$ °C.$^{-1}$) | 6.1 | 7.4 | 3.8 | 6.1 | 7.5 |
| CTE, 500-900° C. ($10^{-7}$ °C$^{-1}$) | — | — | — | — | — |
| Modulus of Rupture, Cellular (psi) | — | — | — | — | — |

TABLE 6-continued

Inventive Examples 26-30

| | Example Number | | | | |
|---|---|---|---|---|---|
| | 26 | 27 | 28 | 29 | 30 |
| Modulus of Rupture, Rod (psi) | — | — | — | — | — |
| % Porosity | 46.3 | 42.8 | 45.3 | 42.5 | 45.1 |
| $d_1$ | 2.5 | 4.0 | 2.7 | 3.8 | 3.2 |
| $d_5$ | 4.1 | 7.1 | 4.5 | 5.1 | 5.3 |
| $d_{10}$ | 5.9 | 8.6 | 5.7 | 6.4 | 6.7 |
| $d_{50}$ | 13.8 | 14.8 | 12.5 | 11.2 | 12.5 |
| $d_{90}$ | 27.2 | 28.3 | 28.8 | 19.8 | 25.4 |
| $d_{95}$ | 46.4 | 47.3 | 79.3 | 34.6 | 49.4 |
| $d_{99}$ | 205 | 170 | 278 | 162 | 198 |
| $(d_{50} - d_{10})/d_{50}$ | 0.57 | 0.42 | 0.55 | 0.43 | 0.46 |
| $(d_{90} - d_{10})/d_{50}$ | 1.54 | 1.33 | 1.84 | 1.20 | 1.50 |
| % Mullite | 0 | 0.7 | 0.9 | 6.3 | 4.7 |
| % Spinel | 2.3 | 4.1 | 2.8 | 2.3 | 1.8 |
| Axial I-Ratio, $I_A$ | 0.29 | 0.31 | 0.30 | 0.37 | 0.34 |
| Transverse I-Ratio, $I_T$ | 0.93 | 0.92 | 0.90 | 0.88 | 0.90 |
| CTE - [34.4($I_A$)-8.7] | 4.8 | 5.4 | 2.2 | 2.1 | 4.5 |
| CTE - [40.0-40.6($I_T$)] | 3.9 | 4.8 | 0.3 | 1.8 | 4.0 |
| $M_A$ | 1713 | 1612 | 2007 | 1800 | 1694 |
| $M_T$ | 3087 | 3257 | 2665 | 3150 | 3186 |
| Filter Diameter (inches) | 2 | 2 | 2 | 2 | 2 |
| Clean Pressure Drop (kPa) | — | 2.8 | — | 3.4 | 2.9 |
| Pressure Drop at 5 g/l soot (kPa) | 9.0 | 9.2 | 9.4 | 10.4 | 8.5 |
| Cell Density (cells/inch$^2$) | 198 | 197 | 200 | 198 | 198 |
| Wall Thickness ($10^{-3}$ inches) | 19.5 | 20.4 | 20.4 | 20.7 | 20.3 |

TABLE 7

Inventive Examples 31-38

| | Example Number | | | | | | | |
|---|---|---|---|---|---|---|---|---|
| | 31 | 32 | 33 | 34 | 35 | 36 | 37 | 38 |
| Maximum Temperature (° C.) | 1425 | 1425 | 1425 | 1425 | 1425 | 1425 | 1425 | 1425 |
| Hold Time (hours) | 15 | 30 | 30 | 22.5 | 22.5 | 30 | 22.5 | 22.5 |

TABLE 7-continued

Inventive Examples 31-38

| | Example Number | | | | | | | |
|---|---|---|---|---|---|---|---|---|
| | 31 | 32 | 33 | 34 | 35 | 36 | 37 | 38 |
| Heating Rate 1160-1200° C. (° C./h) | 6 | 6 | 100 | 47 | 25 | 100 | 47 | 47 |
| Heating Rate 1200-1300° C. (° C./h) | 6 | 6 | 100 | 47 | 25 | 100 | 47 | 47 |
| Heating Rate 1300-1360° C. (° C./h) | 100 | 100 | 100 | 47 | 25 | 100 | 47 | 47 |
| Heating Rate 1360-1425° C. (° C./h) | 100 | 100 | 100 | 47 | 25 | 100 | 47 | 47 |
| Raw Materials | | | | | | | | |
| Talc B | 41.69 | 41.69 | 41.69 | 41.69 | 41.69 | 0 | 0 | 0 |
| Talc H | 0 | 0 | 0 | 0 | 0 | 41.69 | 41.69 | 39.96 |
| Quartz A | 0 | 0 | 0 | 0 | 0 | 20.43 | 20.43 | 0 |
| Quartz C | 20.43 | 20.43 | 20.43 | 20.43 | 20.43 | 0 | 0 | 22.15 |
| Alumina B | 21.88 | 21.88 | 21.88 | 21.88 | 21.88 | 21.88 | 21.88 | 21.54 |
| Al(OH)$_3$ B | 16.00 | 16.00 | 16.00 | 16.00 | 16.00 | 16.00 | 16.00 | 16.35 |
| Kaolin A | 0 | 0 | 0 | 0 | 0 | 0 | 0 | 0 |
| Kaolin B | 0 | 0 | 0 | 0 | 0 | 0 | 0 | 0 |
| Graphite B | 0 | 0 | 0 | 0 | 0 | 0 | 0 | 5.00 |
| Properties | | | | | | | | |
| CTE, 25-800 C. ($10^{-7}$ °C.$^{-1}$) | 6.5 | 6.7 | 6.9 | 6.6 | 5.1 | 8.4 | 7.2 | 8.7 |
| CTE, 500-900° C. ($10^{-7}$ °C.$^{-1}$) | — | — | — | — | — | — | — | — |
| Modulus of Rupture, Cellular (psi) | — | — | — | — | — | — | — | — |
| Modulus of Rupture, Rod (psi) | — | — | — | — | — | — | — | — |
| % Porosity | 48.5 | 49.2 | 46.9 | 48.4 | 46.6 | 42.2 | 44.3 | 49.5 |
| $d_1$ | 1.7 | 1.5 | 4.7 | 1.7 | 2.1 | 5.2 | 3.5 | 3.0 |
| $d_5$ | 3.0 | 2.8 | 7.4 | 3.3 | 3.6 | 7.3 | 4.9 | 5.0 |
| $d_{10}$ | 4.4 | 4.4 | 9.8 | 4.9 | 4.8 | 8.5 | 6.3 | 6.3 |
| $d_{50}$ | 10.3 | 10.8 | 17.1 | 11.8 | 10.6 | 13.6 | 11.2 | 10.6 |
| $d_{90}$ | 23.2 | 21.7 | 32.5 | 24.9 | 22.9 | 27.8 | 24.4 | 14.4 |
| $d_{95}$ | 50.6 | 42.0 | 64.1 | 59.3 | 51.9 | 55.5 | 46.0 | 23.4 |
| $d_{99}$ | 244 | 219 | 217 | 251 | 252 | 190 | 227 | 238 |
| $(d_{50} - d_{10})/d_{50}$ | 0.58 | 0.59 | 0.43 | 0.59 | 0.54 | 0.37 | 0.44 | 0.40 |
| $(d_{90} - d_{10})/d_{50}$ | 1.82 | 1.61 | 1.33 | 1.69 | 1.70 | 1.42 | 1.61 | 0.76 |
| % Mullite | 0 | 0 | 0 | 0 | 0 | 0 | 0 | 0.7 |
| % Spinel | 4.0 | 4.4 | 5.2 | 4.9 | 4.4 | 5.7 | 5 | 3.5 |
| Axial I-Ratio, $I_A$ | 0.33 | 0.34 | 0.40 | 0.37 | 0.35 | 0.37 | 0.34 | 0.40 |
| Transverse I-Ratio, $I_T$ | 0.86 | 0.85 | 0.85 | 0.84 | 0.87 | 0.87 | 0.88 | 0.88 |
| CTE - [34.4($I_A$)-8.7] | 3.8 | 3.7 | 1.8 | 2.6 | 1.8 | 4.4 | 4.2 | 3.6 |
| CTE - [40.0-40.6($I_T$)] | 1.4 | 1.2 | 1.4 | 0.7 | 0.4 | 3.7 | 2.9 | 4.4 |
| $M_A$ | 1780 | 1778 | 2141 | 1946 | 1962 | 1704 | 1692 | 1651 |
| $M_T$ | 2844 | 2840 | 2647 | 2719 | 2791 | 3169 | 3107 | 3394 |
| Filter Diameter (inches) | 2 | 2 | 2 | 2 | 2 | — | — | 2 |
| Clean Pressure Drop (kPa) | — | — | — | 2.7 | — | — | — | 3.2 |
| Pressure Drop at 5 g/l soot (kPa) | 8.3 | 7.9 | 7.4 | 8.0 | 8.0 | — | — | 7.4 |
| Cell Density (cells/inch$^2$) | 193 | 196 | 196 | 200 | 199 | — | — | 207 |
| Wall Thickness ($10^{-3}$ inches) | 21.0 | 20.2 | 19.6 | 20.3 | 20.9 | — | — | 20.2 |

TABLE 8

Inventive Examples 39-42

| | Example Number | | | |
|---|---|---|---|---|
| | 39 | 40 | 41 | 42 |
| Maximum Temperature (° C.) | 1425 | 1425 | 1425 | 1425 |
| Hold Time (hours) | 15 | 15 | 30 | 30 |
| Heating Rate 1160-1200° C. (° C./h) | 6 | 100 | 6 | 100 |
| Heating Rate 1200-1300° C. (° C./h) | 6 | 100 | 6 | 100 |
| Heating Rate 1300-1360° C. (° C./h) | 100 | 6 | 100 | 100 |
| Heating Rate 1360-1425° C. (° C./h) | 100 | 6 | 100 | 100 |
| Average Heating Rate 1160-1425° C. (° C./h) | 11 | 12 | 11 | 100 |
| Raw Materials | | | | |
| Talc B | 41.31 | 41.31 | 41.31 | 41.31 |
| Quartz A | 17.46 | 17.46 | 17.46 | 17.46 |
| Alumina B | 19.23 | 19.23 | 19.23 | 19.23 |
| Al(OH)$_3$ B | 16.00 | 16.00 | 16.00 | 16.00 |
| Kaolin A | 0 | 0 | 0 | 0 |
| Kaolin B | 6.00 | 6.00 | 6.00 | 6.00 |
| Graphite B | 5.00 | 5.00 | 5.00 | 5.00 |
| Properties | | | | |
| CTE, 25-800 C. ($10^{-7}$ °C.$^{-1}$) | 7.8 | 5.6 | 4.7 | 7.9 |
| CTE, 500-900° C. ($10^{-7}$ °C.$^{-1}$) | — | — | — | — |
| Modulus of Rupture, Cellular (psi) | — | — | — | — |
| Modulus of Rupture, Rod (psi) | — | — | — | — |
| % Porosity | 49.2 | 44.5 | 46.9 | 49.1 |

TABLE 8-continued

Inventive Examples 39-42

| | Example Number | | | |
|---|---|---|---|---|
| | 39 | 40 | 41 | 42 |
| $d_1$ | 2.8 | 3.2 | 2.9 | 4.3 |
| $d_5$ | 5.0 | 4.6 | 5.7 | 7.1 |
| $d_{10}$ | 7.0 | 5.6 | 7.6 | 9.4 |
| $d_{50}$ | 16.5 | 10.4 | 16.8 | 16.8 |
| $d_{90}$ | 34.9 | 23.5 | 31.1 | 31.2 |
| $d_{95}$ | 58.7 | 45.4 | 48.6 | 57.1 |
| $d_{99}$ | 225 | 182 | 151 | 200 |
| $(d_{50} - d_{10})/d_{50}$ | 0.58 | 0.46 | 0.55 | 0.44 |
| $(d_{90} - d_{10})/d_{50}$ | 1.69 | 1.72 | 1.40 | 1.30 |
| % Mullite | 0 | 0 | 0 | 0 |
| % Spinel | 3.8 | 4.6 | 3.9 | 5.6 |
| Axial I-Ratio, $I_A$ | 0.33 | 0.36 | 0.33 | 0.37 |
| Transverse I-Ratio, $I_T$ | 0.88 | 0.85 | 0.89 | 0.84 |

TABLE 8-continued

Inventive Examples 39-42

| | Example Number | | | |
|---|---|---|---|---|
| | 39 | 40 | 41 | 42 |
| CTE - [34.4($I_A$)-8.7] | 5.1 | 1.9 | 2.0 | 3.9 |
| CTE - [40.0-40.6($I_T$)] | 3.5 | 0.1 | 0.8 | 2.0 |
| $M_A$ | 1875 | 1921 | 2093 | 1939 |
| $M_T$ | 2767 | 2797 | 2616 | 2688 |
| Filter Diameter (inches) | 2 | 2 | 2 | 2 |
| Clean Pressure Drop (kPa) | — | — | — | — |
| Pressure Drop at 5 g/l soot (kPa) | 8.0 | 9.0 | 7.9 | 7.6 |
| Cell Density (cells/inch²) | 197 | 206 | 196 | 197 |
| Wall Thickness ($10^{-3}$ inches) | 20.9 | 20.5 | 19.7 | 19.6 |

TABLE 9

Inventive Examples 43-48

| | Example Number | | | | | |
|---|---|---|---|---|---|---|
| | 43 | 44 | 45 | 46 | 47 | 48 |
| Maximum Temperature (° C.) | 1425 | 1425 | 1425 | 1425 | 1425 | 1425 |
| Hold Time (hours) | 15 | 30 | 15 | 30 | 30 | 15 |
| Heating Rate 1160-1200° C. (° C./h) | 6 | 6 | 6 | 6 | 6 | 6 |
| Heating Rate 1200-1300° C. (° C./h) | 6 | 6 | 6 | 6 | 6 | 6 |
| Heating Rate 1300-1360° C. (° C./h) | 100 | 100 | 100 | 6 | 100 | 6 |
| Heating Rate 1360-1425° C. (° C./h) | 100 | 100 | 100 | 6 | 100 | 6 |
| Average Heating Rate 1160-1425° C. (° C./h) | 11 | 11 | 11 | 6 | 11 | 6 |
| Raw Materials | | | | | | |
| Talc B | 40.70 | 40.70 | 40.70 | 40.70 | 40.70 | 40.70 |
| Quartz B | 12.50 | 12.50 | 12.50 | 12.50 | 12.50 | 12.50 |
| Alumina B | 14.80 | 14.80 | 14.80 | 14.80 | 14.80 | 14.80 |
| Al(OH)₃ B | 16.00 | 16.00 | 16.00 | 16.00 | 16.00 | 16.00 |
| Kaolin A | 0 | 0 | 0 | 0 | 0 | 0 |
| Kaolin B | 16.00 | 16.00 | 16.00 | 16.00 | 16.00 | 16.00 |
| Graphite F | 0 | 0 | 18.00 | 18.00 | 18.00 | 18.00 |
| Properties | | | | | | |
| CTE, 25-800 C. ($10^{-7}$° C.$^{-1}$) | 5.0 | 4.2 | 7.9 | 5.6 | 7.2 | 6.5 |
| CTE, 500-900° C. ($10^{-7}$° C.$^{-1}$) | — | — | — | — | — | — |
| Modulus of Rupture, Cellular (psi) | — | — | — | — | — | — |
| Modulus of Rupture, Rod (psi) | — | — | — | — | — | — |
| % Porosity | 41.9 | 42.5 | 52.5 | 51.4 | 52.2 | 50.3 |
| $d_1$ | 1.3 | 1.3 | 2.0 | 1.1 | 2.0 | 1.8 |
| $d_5$ | 3.0 | 3.7 | 4.4 | 3.0 | 4.6 | 3.1 |
| $d_{10}$ | 4.8 | 5.5 | 6.3 | 4.3 | 6.4 | 4.2 |
| $d_{50}$ | 13.6 | 13.9 | 14.8 | 11.3 | 15.1 | 10.8 |
| $d_{90}$ | 27.2 | 26.3 | 26.7 | 21.9 | 29.1 | 20.0 |
| $d_{95}$ | 44.6 | 41.3 | 40.1 | 42.2 | 47.4 | 31.4 |
| $d_{99}$ | 164 | 158 | 118 | 202 | 169 | 114 |
| $(d_{50} - d_{10})/d_{50}$ | 0.65 | 0.60 | 0.58 | 0.62 | 0.58 | 0.61 |
| $(d_{90} - d_{10})/d_{50}$ | 1.65 | 1.50 | 1.38 | 1.56 | 1.51 | 1.46 |
| % Mullite | 0 | 0 | 0 | 0 | 0 | 0.6 |
| % Spinel | 3.6 | 3.4 | 3.0 | 2.9 | 3.6 | 2.5 |
| Axial I-Ratio, $I_A$ | 0.33 | 0.32 | 0.38 | 0.38 | 0.39 | 0.37 |
| Transverse I-Ratio, $I_T$ | 0.88 | 0.89 | 0.85 | 0.87 | 0.86 | 0.87 |
| CTE - [34.4($I_A$)-8.7] | 0.7 | 0.3 | 2.4 | 0.9 | 2.1 | 1.8 |
| CTE - [40.0-40.6($I_T$)] | 2.3 | 1.9 | 3.5 | 1.2 | 2.5 | 2.5 |
| $M_A$ | 1903 | 1943 | 1947 | 2080 | 2098 | 1894 |
| $M_T$ | 2843 | 2806 | 2757 | 2741 | 2670 | 2925 |
| Filter Diameter (inches) | | | | | | |
| Clean Pressure Drop (kPa) | 2 | 2 | 2 | 2 | 2 | 2 |
| Pressure Drop at 5 g/l soot (kPa) | 11.5 | 11.0 | 8.5 | 9.2 | 6.6 | 8.5 |
| Cell Density (cells/inch²) | 204 | 196 | 207 | 211 | 206 | 209 |
| Wall Thickness ($10^{-3}$ inches) | 19.3 | 20.0 | 20.0 | 20.0 | 20.3 | 20.0 |

TABLE 10

Pore Size Distribution Data for Examples 1-9

| | Example Number | | | | | | | | |
|---|---|---|---|---|---|---|---|---|---|
| | 1 | 2 | 3 | 4 | 5 | 6 | 7 | 8 | 9 |
| Total PoreVolume (cm³/g) | 0.3445 | 0.4318 | 0.4160 | 0.3388 | 0.4243 | 0.4337 | 0.4182 | 0.3357 | 0.3792 |
| % TPV ≦ 1 μm | 0.3 | 0.4 | 0.2 | 0.3 | 0.1 | 0.3 | 0.0 | 0.2 | 0.2 |
| % TPV ≦ 2 μm | 0.6 | 0.5 | 0.3 | 0.4 | 0.2 | 0.4 | 0.1 | 0.4 | 0.3 |
| % TPV ≦ 3 μm | 1.7 | 0.6 | 0.5 | 0.8 | 0.3 | 0.8 | 0.1 | 0.7 | 0.3 |
| % TPV ≦ 4 μm | 3.8 | 1.2 | 0.7 | 2.7 | 0.5 | 2.3 | 0.1 | 1.3 | 0.3 |
| % TPV ≦ 5 μm | 6.7 | 2.7 | 1.0 | 5.9 | 0.6 | 4.9 | 0.1 | 2.5 | 0.3 |
| % TPV ≦ 6 μm | 10.6 | 5.1 | 1.7 | 10.5 | 0.8 | 8.9 | 0.1 | 4.8 | 0.3 |
| % TPV ≦ 10 μm | 34.3 | 24.9 | 12.4 | 37.4 | 4.7 | 35.0 | 4.9 | 26.4 | 10.1 |
| % TPV ≦ 15 μm | 72.5 | 61.9 | 46.9 | 72.2 | 21.2 | 74.4 | 29.3 | 64.1 | 50.8 |
| % TPV ≦ 20 μm | 87.0 | 86.3 | 80.3 | 85.5 | 53.7 | 87.3 | 67.7 | 82.1 | 85.8 |
| % TPV ≦ 25 μm | 91.1 | 91.2 | 87.6 | 90.2 | 82.5 | 91.2 | 85.2 | 87.8 | 91.8 |
| % TPV ≦ 30 μm | 93.4 | 93.2 | 90.6 | 92.6 | 90.1 | 93.1 | 90.2 | 90.7 | 93.6 |
| % TPV ≦ 40 μm | 95.2 | 95.3 | 92.8 | 95.0 | 94.2 | 95.2 | 93.9 | 94.1 | 95.3 |
| % TPV ≦ 50 μm | 96.3 | 96.2 | 94.2 | 95.9 | 95.6 | 96.1 | 95.2 | 95.4 | 96.0 |
| % TPV ≦ 60 μm | 97.4 | 96.9 | 95.5 | 96.7 | 96.6 | 96.9 | 96.2 | 96.5 | 96.7 |
| % TPV ≦ 70 μm | 97.8 | 97.3 | 96.1 | 97.1 | 97.0 | 97.4 | 96.8 | 97.1 | 97.1 |
| % TPV ≦ 80 μm | 98.1 | 97.6 | 96.5 | 97.5 | 97.5 | 97.7 | 97.3 | 97.6 | 97.4 |
| % TPV ≦ 90 μm | 98.3 | 97.8 | 96.9 | 97.7 | 97.8 | 98.0 | 97.6 | 98.0 | 97.7 |
| % TPV ≦ 100 μm | 98.5 | 98.0 | 97.2 | 98.0 | 98.1 | 98.2 | 97.8 | 98.2 | 97.9 |

TABLE 11

Pore Size Distribution Data for Examples 10-18

| | Example Number | | | | | | | | |
|---|---|---|---|---|---|---|---|---|---|
| | 10 | 11 | 12 | 13 | 14 | 15 | 16 | 17 | 18 |
| Total PoreVolume (cm³/g) | 0.3512 | 0.3127 | 0.4349 | 0.3427 | 0.3214 | 0.3252 | 0.3071 | 0.3219 | 0.3527 |
| % TPV ≦ 1 μm | 0.0 | 0.0 | 0.0 | 0.0 | 0.2 | 0.3 | 0.1 | 0.7 | 0.8 |
| % TPV ≦ 2 μm | 0.0 | 0.0 | 0.0 | 0.4 | 0.6 | 0.9 | 0.3 | 1.3 | 1.4 |
| % TPV ≦ 3 μm | 0.0 | 0.1 | 0.0 | 1.2 | 1.8 | 2.5 | 0.7 | 1.8 | 2.3 |
| % TPV ≦ 4 μm | 0.0 | 0.2 | 0.0 | 2.9 | 4.5 | 4.7 | 1.4 | 2.5 | 3.9 |
| % TPV ≦ 5 μm | 0.0 | 0.3 | 0.0 | 5.6 | 8.4 | 7.4 | 3.1 | 3.7 | 6.0 |
| % TPV ≦ 6 μm | 0.0 | 0.3 | 0.1 | 8.9 | 13.3 | 10.8 | 5.1 | 4.6 | 8.6 |
| % TPV ≦ 10 μm | 8.3 | 5.2 | 3.6 | 29.8 | 41.8 | 32.0 | 15.6 | 19.0 | 26.7 |
| % TPV ≦ 15 μm | 34.8 | 25.5 | 17.9 | 65.1 | 79.6 | 71.1 | 43.2 | 46.9 | 63.0 |
| % TPV ≦ 20 μm | 67.9 | 56.6 | 45.8 | 84.1 | 88.4 | 85.6 | 76.1 | 75.8 | 84.7 |
| % TPV ≦ 25 μm | 82.2 | 76.9 | 78.5 | 89.3 | 91.4 | 89.8 | 86.7 | 86.0 | 89.8 |
| % TPV ≦ 30 μm | 88.6 | 85.0 | 88.8 | 91.9 | 92.9 | 91.9 | 90.5 | 89.9 | 92.1 |
| % TPV ≦ 40 μm | 93.6 | 91.1 | 93.8 | 93.9 | 94.6 | 94.0 | 93.9 | 93.4 | 94.4 |
| % TPV ≦ 50 μm | 95.2 | 93.5 | 95.4 | 95.1 | 95.3 | 95.0 | 95.2 | 94.8 | 95.4 |
| % TPV ≦ 60 μm | 96.7 | 95.2 | 96.4 | 96.2 | 95.9 | 95.8 | 96.3 | 95.9 | 96.3 |
| % TPV ≦ 70 μm | 97.3 | 96.0 | 97.0 | 96.6 | 96.3 | 96.2 | 96.8 | 96.5 | 96.7 |
| % TPV ≦ 80 μm | 98.0 | 96.7 | 97.5 | 97.1 | 96.7 | 96.6 | 97.2 | 97.0 | 97.1 |
| % TPV ≦ 90 μm | 98.3 | 97.2 | 97.9 | 97.3 | 96.9 | 96.9 | 97.5 | 97.3 | 97.4 |
| % TPV ≦ 100 μm | 98.6 | 97.7 | 98.1 | 97.6 | 97.1 | 97.1 | 97.8 | 97.6 | 97.6 |

TABLE 12

Pore Size Distribution Data for Examples 19-27

| | Example Number | | | | | | | | |
|---|---|---|---|---|---|---|---|---|---|
| | 19 | 20 | 21 | 22 | 23 | 24 | 25 | 26 | 27 |
| Total PoreVolume (cm³/g) | 0.3652 | 0.3946 | 0.3596 | 0.3503 | 0.4068 | 0.3803 | 0.3972 | 0.3348 | 0.2951 |
| % TPV ≦ 1 μm | 0.0 | 0.0 | 0.2 | 0.0 | 0.2 | 0.2 | 0.0 | 0.1 | 0.2 |
| % TPV ≦ 2 μm | 0.1 | 0.1 | 0.3 | 0.0 | 0.4 | 0.4 | 0.1 | 0.4 | 0.5 |
| % TPV ≦ 3 μm | 0.1 | 0.2 | 0.5 | 0.1 | 0.6 | 0.6 | 0.2 | 2.2 | 0.7 |
| % TPV ≦ 4 μm | 0.5 | 0.3 | 0.9 | 0.2 | 1.0 | 0.8 | 0.3 | 4.7 | 1.0 |
| % TPV ≦ 5 μm | 2.0 | 0.8 | 2.2 | 0.3 | 1.8 | 1.1 | 0.6 | 7.3 | 1.7 |
| % TPV ≦ 6 μm | 4.1 | 2.2 | 4.3 | 0.5 | 2.8 | 1.3 | 0.7 | 10.4 | 2.8 |
| % TPV ≦ 10 μm | 23.9 | 17.8 | 21.8 | 12.1 | 13.0 | 2.3 | 9.8 | 26.9 | 16.5 |
| % TPV ≦ 15 μm | 67.2 | 45.9 | 50.7 | 50.9 | 33.2 | 8.5 | 35.2 | 59.7 | 51.2 |
| % TPV ≦ 20 μm | 87.4 | 75.8 | 76.6 | 80.1 | 56.7 | 31.6 | 63.5 | 82.5 | 79.7 |
| % TPV ≦ 25 μm | 91.4 | 86.7 | 86.5 | 88.1 | 75.1 | 67.4 | 79.8 | 88.6 | 87.6 |
| % TPV ≦ 30 μm | 93.2 | 90.5 | 90.2 | 91.0 | 84.8 | 82.5 | 86.2 | 91.4 | 90.8 |

TABLE 12-continued

Pore Size Distribution Data for Examples 19-27

| | Example Number | | | | | | | | |
|---|---|---|---|---|---|---|---|---|---|
| | 19 | 20 | 21 | 22 | 23 | 24 | 25 | 26 | 27 |
| % TPV ≦ 40 μm | 95.0 | 93.6 | 93.5 | 93.9 | 91.8 | 90.1 | 91.3 | 94.2 | 93.9 |
| % TPV ≦ 50 μm | 95.9 | 95.0 | 95.0 | 95.2 | 94.4 | 92.7 | 93.4 | 95.4 | 95.3 |
| % TPV ≦ 60 μm | 96.6 | 96.0 | 96.0 | 96.3 | 95.9 | 94.2 | 94.7 | 96.2 | 96.3 |
| % TPV ≦ 70 μm | 97.0 | 96.5 | 96.5 | 96.8 | 96.6 | 95.0 | 95.4 | 96.6 | 96.8 |
| % TPV ≦ 80 μm | 97.4 | 97.0 | 97.0 | 97.4 | 97.3 | 95.8 | 96.0 | 97.1 | 97.3 |
| % TPV ≦ 90 μm | 97.6 | 97.3 | 97.4 | 97.7 | 97.7 | 96.3 | 96.5 | 97.4 | 97.6 |
| % TPV ≦ 100 μm | 97.9 | 97.6 | 97.7 | 98.0 | 98.1 | 96.7 | 96.9 | 97.6 | 97.9 |

TABLE 13

Pore Size Distribution Data for Examples 28-35

| | Example Number | | | | | | | |
|---|---|---|---|---|---|---|---|---|
| | 28 | 29 | 30 | 31 | 32 | 33 | 34 | 35 |
| Total PoreVolume (cm³/g) | 0.3370 | 0.2862 | 0.3121 | 0.3617 | 0.3842 | 0.3625 | 0.3656 | 0.3458 |
| % TPV ≦ 1 μm | 0.3 | 0.2 | 0.2 | 0.3 | 0.4 | 0.0 | 0.4 | 0.2 |
| % TPV ≦ 2 μm | 0.5 | 0.3 | 0.4 | 1.7 | 2.5 | 0.1 | 1.5 | 0.9 |
| % TPV ≦ 3 μm | 1.4 | 0.4 | 0.8 | 5.2 | 5.8 | 0.1 | 4.2 | 3.1 |
| % TPV ≦ 4 μm | 3.7 | 1.4 | 2.0 | 8.6 | 8.9 | 0.6 | 7.2 | 6.5 |
| % TPV ≦ 5 μm | 6.8 | 4.4 | 4.2 | 12.6 | 12.1 | 1.2 | 10.2 | 10.9 |
| % TPV ≦ 6 μm | 11.3 | 8.1 | 6.5 | 17.6 | 16.3 | 2.4 | 13.5 | 16.0 |
| % TPV ≦ 10 μm | 34.0 | 37.1 | 30.9 | 46.8 | 42.6 | 10.5 | 33.9 | 44.8 |
| % TPV ≦ 15 μm | 65.4 | 81.3 | 70.0 | 80.4 | 78.6 | 34.1 | 76.3 | 80.0 |
| % TPV ≦ 20 μm | 82.5 | 90.2 | 85.4 | 88.1 | 88.7 | 69.9 | 87.0 | 88.3 |
| % TPV ≦ 25 μm | 88.0 | 92.8 | 89.8 | 90.7 | 91.7 | 84.4 | 90.0 | 90.9 |
| % TPV ≦ 30 μm | 90.6 | 94.1 | 91.9 | 92.2 | 93.2 | 88.7 | 91.6 | 92.3 |
| % TPV ≦ 40 μm | 93.1 | 95.8 | 94.1 | 94.0 | 94.9 | 92.2 | 93.4 | 94.0 |
| % TPV ≦ 50 μm | 94.1 | 96.6 | 95.1 | 95.0 | 95.6 | 93.6 | 94.3 | 94.8 |
| % TPV ≦ 60 μm | 95.1 | 97.3 | 95.9 | 95.7 | 96.3 | 94.8 | 95.1 | 95.6 |
| % TPV ≦ 70 μm | 95.6 | 97.6 | 96.2 | 96.2 | 96.7 | 95.4 | 95.5 | 96.1 |
| % TPV ≦ 80 μm | 96.0 | 97.9 | 96.6 | 96.6 | 97.0 | 95.9 | 96.0 | 96.5 |
| % TPV ≦ 90 μm | 96.3 | 98.1 | 96.9 | 96.9 | 97.3 | 96.3 | 96.4 | 96.8 |
| % TPV ≦ 100 μm | 96.6 | 98.3 | 97.3 | 97.2 | 97.5 | 96.7 | 96.7 | 97.0 |

TABLE 14

Pore Size Distribution Data for Examples 36-42

| | Example Number | | | | | | |
|---|---|---|---|---|---|---|---|
| | 36 | 37 | 38 | 39 | 40 | 41 | 42 |
| Total PoreVolume (cm³/g) | 0.2962 | 0.3149 | 0.3998 | 0.3860 | 0.3225 | 0.3602 | 0.3712 |
| % TPV ≦ 1 μm | 0.3 | 0.0 | 0.2 | 0.1 | 0.1 | 0.3 | 0.2 |
| % TPV ≦ 2 μm | 0.4 | 0.1 | 0.3 | 0.4 | 0.2 | 0.7 | 0.3 |
| % TPV ≦ 3 μm | 0.5 | 0.5 | 1.0 | 1.3 | 0.7 | 1.0 | 0.5 |
| % TPV ≦ 4 μm | 0.6 | 2.1 | 2.7 | 3.0 | 2.7 | 2.0 | 0.9 |
| % TPV ≦ 5 μm | 0.9 | 5.5 | 5.1 | 5.0 | 6.6 | 3.7 | 1.7 |
| % TPV ≦ 6 μm | 1.3 | 8.5 | 8.5 | 7.4 | 12.4 | 5.7 | 3.1 |
| % TPV ≦ 10 μm | 18.4 | 38.4 | 41.2 | 20.2 | 45.9 | 17.9 | 11.8 |
| % TPV ≦ 15 μm | 64.0 | 79.2 | 91.4 | 42.5 | 80.5 | 40.3 | 35.7 |
| % TPV ≦ 20 μm | 84.2 | 87.8 | 94.5 | 66.4 | 87.9 | 68.8 | 73.9 |
| % TPV ≦ 25 μm | 88.6 | 90.2 | 95.1 | 80.7 | 90.8 | 84.1 | 85.7 |
| % TPV ≦ 30 μm | 90.9 | 91.6 | 95.5 | 87.0 | 92.5 | 89.3 | 89.5 |
| % TPV ≦ 40 μm | 93.3 | 94.4 | 96.3 | 91.9 | 94.5 | 93.5 | 92.8 |
| % TPV ≦ 50 μm | 94.4 | 95.4 | 96.6 | 93.9 | 95.4 | 95.2 | 94.1 |
| % TPV ≦ 60 μm | 95.4 | 96.3 | 96.9 | 95.2 | 96.2 | 96.3 | 95.3 |
| % TPV ≦ 70 μm | 95.9 | 96.7 | 97.1 | 95.8 | 96.7 | 96.9 | 95.9 |
| % TPV ≦ 80 μm | 96.4 | 97.1 | 97.2 | 96.4 | 97.1 | 97.5 | 96.4 |
| % TPV ≦ 90 μm | 96.7 | 97.3 | 97.4 | 96.8 | 97.4 | 97.9 | 96.7 |
| % TPV ≦ 100 μm | 97.0 | 97.4 | 97.5 | 97.2 | 97.6 | 98.2 | 97.1 |

TABLE 15

Pore Size Distribution Data for Examples 43-48

| | Example Number | | | | | |
|---|---|---|---|---|---|---|
| | 43 | 44 | 45 | 46 | 47 | 48 |
| Total PoreVolume (cm³/g) | 0.2986 | 0.2857 | 0.4431 | 0.3967 | 0.4198 | 0.3876 |
| % TPV ≦ 1 μm | 0.6 | 0.7 | 0.3 | 0.9 | 0.3 | 0.2 |
| % TPV ≦ 2 μm | 2.2 | 1.7 | 1.0 | 2.2 | 1.0 | 1.4 |
| % TPV ≦ 3 μm | 5.0 | 3.3 | 2.4 | 4.9 | 2.0 | 4.6 |
| % TPV ≦ 4 μm | 7.6 | 5.7 | 4.3 | 8.9 | 3.8 | 9.1 |
| % TPV ≦ 5 μm | 10.5 | 8.3 | 6.5 | 13.6 | 5.9 | 14.2 |
| % TPV ≦ 6 μm | 13.4 | 11.6 | 9.2 | 18.6 | 8.9 | 19.2 |
| % TPV ≦ 10 μm | 29.7 | 27.2 | 23.8 | 40.7 | 22.9 | 43.9 |
| % TPV ≦ 15 μm | 59.6 | 58.3 | 51.3 | 77.3 | 49.4 | 79.4 |
| % TPV ≦ 20 μm | 81.5 | 82.0 | 79.7 | 88.4 | 78.0 | 90.1 |
| % TPV ≦ 25 μm | 88.4 | 89.0 | 88.6 | 91.7 | 86.9 | 93.2 |
| % TPV ≦ 30 μm | 91.6 | 91.9 | 91.9 | 93.2 | 90.5 | 94.7 |
| % TPV ≦ 40 μm | 94.5 | 94.8 | 95.0 | 94.8 | 93.8 | 96.4 |
| % TPV ≦ 50 μm | 95.6 | 96.0 | 96.3 | 95.6 | 95.3 | 97.1 |
| % TPV ≦ 60 μm | 96.7 | 97.1 | 97.2 | 96.2 | 96.3 | 97.8 |
| % TPV ≦ 70 μm | 97.2 | 97.5 | 97.7 | 96.6 | 96.9 | 98.1 |
| % TPV ≦ 80 μm | 97.6 | 97.9 | 98.2 | 97.0 | 97.4 | 98.4 |
| % TPV ≦ 90 μm | 97.9 | 98.3 | 98.5 | 97.3 | 97.7 | 98.6 |
| % TPV ≦ 100 μm | 98.1 | 98.6 | 98.7 | 97.6 | 98.0 | 98.8 |

TABLE 16

Comparative Examples 1-6

| | Example Number | | | | | |
|---|---|---|---|---|---|---|
| | C1 | C2 | C3 | C4 | C5 | C6 |
| Maximum Temperature (° C.) | 1410 | 1425 | 1420 | 1400 | 1400 | 1400 |
| Hold Time (hours) | 11 | 15 | 15 | 7 | 7 | 7 |
| Heating Rate 1150-1200° C. (° C./h) | 25 | 25 | 22 | 7 | 7 | 7 |
| Heating Rate 1200-1300° C. (° C./h) | 25 | 25 | 48 | 23 | 23 | 23 |
| Heating Rate 1300-1360° C. (° C./h) | 25 | 25 | 48 | 23 | 23 | 23 |
| Heating Rate 1360-Max. Temp. (° C./h) | 5 | 6 | 48 | 23 | 23 | 23 |
| Raw Materials | | | | | | |
| Talc B | 40.70 | 40.70 | 40.70 | 0 | 0 | 0 |
| Talc D | 0 | 0 | 0 | 39.90 | 0 | 0 |
| Talc E | 0 | 0 | 0 | 0 | 39.90 | 40.70 |
| Quartz B | 12.50 | 12.50 | 12.50 | 0 | 0 | 0 |
| Quartz D | 0 | 0 | 0 | 12.70 | 12.70 | 12.50 |
| Alumina B | 0 | 0 | 14.80 | 15.00 | 15.00 | 14.80 |
| Alumina C | 14.80 | 14.80 | 0 | 0 | 0 | 0 |
| Al(OH)$_3$ B | 0 | 0 | 16.00 | 0 | 0 | 0 |
| Al(OH)$_3$ D | 16.00 | 16.00 | 0 | 15.80 | 15.80 | 16.00 |
| Kaolin A | 0 | 0 | 0 | 0 | 0 | 0 |
| Kaolin B | 16.00 | 16.00 | 16.00 | 16.60 | 16.60 | 16.00 |
| Graphite A | 20.00 | 20.00 | 0 | 0 | 0 | 0 |
| Properties | | | | | | |
| CTE, 25-800 C. ($10^{-7}$ ° C.$^{-1}$) | 4.6 | 3.2 | 4.4 | 3.3 | 0.9 | 1.2 |
| CTE, 500-900° C. ($10^{-7}$ ° C.$^{-1}$) | 11.6 | 11.0 | 11.2 | — | — | — |
| Modulus of Rupture, Cellular (psi) | 832 | 722 | 671 | — | — | — |
| Modulus of Rupture, Rod (psi) | — | 1669 | — | — | — | — |
| Elastic Modulus at 25° C. ($10^6$ psi) | — | — | 1.15 | — | — | — |
| Elastic Modulus at 1000° C. ($10^6$ psi) | — | — | 1.60 | — | — | — |
| E(1000° C.)/E(25° C.) | — | — | 1.39 | — | — | — |
| MOR/E (%) | — | — | 0.058 | — | — | — |
| Thermal Shock Parameter (° C.) | — | — | 519 | — | — | — |
| % Porosity | 51.9 | 46.0 | 43.2 | 44.8 | 42.9 | 43.5 |
| $d_{10}$ | 3.3 | 6.7 | 5.4 | 3.1 | 4.2 | 3.7 |
| $d_{50}$ | 11.1 | 13.6 | 12.3 | 15.4 | 12.3 | 12.1 |
| $d_{90}$ | 21.1 | 27.2 | 27.2 | 39.3 | 35.8 | 29.6 |
| $(d_{50} - d_{10})/d_{50}$ | 0.70 | 0.51 | 0.56 | 0.80 | 0.66 | 0.69 |
| $(d_{90} - d_{10})/d_{50}$ | 1.60 | 1.51 | 1.77 | 2.35 | 2.57 | 2.14 |
| % Mullite | 0.5 | 0 | 0 | — | — | — |
| % Spinel | 4.4 | 3.2 | 4.1 | — | — | — |
| Axial I-Ratio, $I_A$ | 0.40 | 0.38 | 0.45 | — | — | — |
| Transverse I-Ratio, $I_T$ | 0.87 | 0.86 | 0.84 | 0.88 | 0.90 | 0.90 |
| CTE - [34.4($I_A$)-8.7] | -0.5 | -1.2 | -2.4 | — | — | — |

TABLE 16-continued

Comparative Examples 1-6

| | Example Number | | | | | |
|---|---|---|---|---|---|---|
| | C1 | C2 | C3 | C4 | C5 | C6 |
| CTE - [40.0-40.6($I_T$)] | −0.1 | −1.9 | −1.5 | −1.0 | −2.6 | −2.3 |
| $M_A$ | 2252 | 2344 | 2430 | — | — | — |
| $M_T$ | 2632 | 2428 | 2545 | 2252 | 2212 | 2392 |
| Filter Diameter (inches) | 2.0 | — | — | — | — | — |
| Clean Pressure Drop (kPa) | 3.87 | — | — | — | — | — |
| Pressure Drop at 5 g/l soot (kPa) | 12.11 | — | — | — | — | — |
| Cell Density (cells/inch$^2$) | 213 | — | — | — | — | — |
| Wall Thickness ($10^{-3}$ inches) | 20.5 | — | — | — | — | — |

TABLE 17

Comparative Examples 7-13

| | Example Number | | | | | | |
|---|---|---|---|---|---|---|---|
| | C7 | C8 | C9 | C10 | C11 | C12 | C13 |
| Maximum Temperature (° C.) | 1400 | 1400 | 1400 | 1400 | 1400 | 1400 | 1405 |
| Hold Time (hours) | 7 | 7 | 7 | 7 | 7 | 7 | 11 |
| Heating Rate 1150-1200° C. (° C./h) | 7 | 7 | 7 | 7 | 7 | 7 | 25 |
| Heating Rate 1200-1300° C. (° C./h) | 23 | 23 | 23 | 23 | 23 | 23 | 25 |
| Heating Rate 1300-1360° C. (° C./h) | 23 | 23 | 23 | 23 | 23 | 23 | 25 |
| Heating Rate 1360-Max. Temp. (° C./h) | 23 | 23 | 23 | 23 | 23 | 23 | 5 |
| Raw Materials | | | | | | | |
| Talc B | 39.90 | 40.70 | 40.70 | 40.70 | 0 | 0 | 40.70 |
| Talc F | 0 | 0 | 0 | 0 | 39.90 | 39.90 | 0 |
| Quartz B | 0 | 0 | 0 | 0 | 0 | 0 | 12.50 |
| Quartz C | 0 | 0 | 0 | 0 | 0 | 12.70 | 0 |
| Quartz D | 12.70 | 6.30 | 6.30 | 6.30 | 12.70 | 0 | 0 |
| Quartz E | 0 | 6.30 | 6.30 | 6.30 | 0 | 0 | 0 |
| Alumina B | 15.00 | 0 | 0 | 0 | 15.00 | 15.00 | 0 |
| Alumina C | 0 | 0 | 0 | 0 | 0 | 0 | 14.80 |
| Alumina D | 0 | 14.80 | 14.80 | 14.80 | 0 | 0 | 0 |
| Al(OH)$_3$ D | 15.80 | 16.00 | 16.00 | 16.00 | 15.80 | 15.80 | 16.00 |
| Kaolin A | 0 | 0 | 0 | 0 | 0 | 0 | 0 |
| Kaolin B | 16.60 | 16.00 | 16.00 | 16.00 | 16.60 | 16.60 | 16.00 |
| Graphite C | 0 | 0 | 0 | 0 | 15.00 | 15.00 | 0 |
| Graphite D | 10.00 | 0 | 10.00 | 10.00 | 0 | 0 | 0 |
| Graphite E | 0 | 0 | 0 | 0 | 0 | 0 | 20.00 |
| Cellulose | 0 | 0 | 2.00 | 10.00 | 0 | 0 | 0 |
| Properties | | | | | | | |
| CTE, 25-800 C. ($10^{-7}$° C.$^{-1}$) | 3.4 | 1.4 | 2.8 | 1.5 | 6.1 | 6.2 | 3.5 |
| % Porosity | 51.5 | 46.6 | 45.7 | 49.8 | 50.0 | 48.4 | 49.5 |
| $d_{10}$ | 4.1 | 3.7 | 4.7 | 5.2 | 4.1 | 2.3 | 5.1 |
| $d_{50}$ | 10.9 | 11.7 | 13.1 | 12.4 | 15.0 | 11.0 | 11.9 |
| $d_{90}$ | 22.4 | 57.4 | 63.9 | 60.2 | 33.0 | 29.9 | 35.7 |
| $(d_{50} - d_{10})/d_{50}$ | 0.62 | 0.68 | 0.64 | 0.58 | 0.73 | 0.80 | 0.57 |
| $(d_{90} - d_{10})/d_{50}$ | 1.68 | 4.59 | 4.52 | 4.44 | 1.93 | 2.51 | 2.57 |
| % Mullite | — | — | — | — | — | — | — |
| % Spinel | — | — | — | — | — | — | — |
| Axial I-Ratio, $I_A$ | — | — | — | — | — | — | 0.37 |
| Transverse I-Ratio, $I_T$ | 0.88 | 0.89 | 0.90 | 0.88 | 0.84 | 0.81 | 0.89 |
| CTE - [34.4($I_A$)-8.7] | — | — | — | — | — | — | −0.5 |
| CTE - [40.0-40.6($I_T$)] | −0.9 | −2.5 | −0.7 | −2.8 | 0.2 | −0.9 | −0.4 |
| $M_A$ | — | — | — | — | — | — | 2497 |
| $M_T$ | 2516 | 1558 | 1624 | 1360 | 2407 | 2403 | 2285 |

TABLE 18

Comparative Examples 14-19

| | Example Number | | | | | |
|---|---|---|---|---|---|---|
| | C14 | C15 | C16 | C17 | C18 | C19 |
| Maximum Temperature (° C.) | 1425 | 1425 | 1415 | 1415 | 1415 | 1405 |
| Hold Time (hours) | 25 | 25 | 25 | 25 | 25 | 11 |
| Heating Rate 1150-1200° C. (° C./h) | 50 | 50 | 25 | 25 | 25 | 25 |
| Heating Rate 1200-1300° C. (° C./h) | 50 | 50 | 25 | 25 | 25 | 25 |
| Heating Rate 1300-1360° C. (° C./h) | 50 | 50 | 25 | 25 | 25 | 25 |
| Heating Rate 1360-Max. Temp. (° C./h) | 50 | 50 | 6 | 6 | 6 | 5 |
| Raw Materials | | | | | | |
| Talc B | 39.76 | 39.76 | 0 | 0 | 0 | 39.86 |
| Talc G | 0 | 0 | 39.96 | 39.96 | 39.96 | 0 |
| Quartz B | 22.04 | 22.04 | 22.15 | 0 | 22.15 | 22.09 |
| Quartz C | 0 | 0 | 0 | 22.15 | 0 | 0 |
| Alumina B | 20.50 | 20.50 | 21.54 | 21.54 | 21.54 | 19.05 |
| Boehmite | 0 | 0 | 0 | 0 | 0 | 4.99 |
| Al(OH)$_3$ C | 0 | 17.70 | 0 | 0 | 0 | 0 |
| Al(OH)$_3$ D | 17.70 | 0 | 16.35 | 16.35 | 16.35 | 14.01 |
| Kaolin A | 0 | 0 | 0 | 0 | 0 | 0 |
| Kaolin B | 0 | 0 | 0 | 0 | 0 | 0 |
| Graphite A | 0 | 0 | 40.00 | 0 | 0 | 0 |
| Graphite B | 0 | 0 | 0 | 0 | 0 | 30.00 |
| Graphite E | 0 | 0 | 0 | 0 | 40.00 | 0 |
| Potato Starch | 0 | 0 | 0 | 25.00 | 0 | 0 |
| Properties | | | | | | |
| CTE, 25-800 C. ($10^{-7}$° C.$^{-1}$) | 5.8 | 6.9 | 6.2 | 6.4 | 5.9 | 5.2 |
| % Porosity | 52.4 | 52.1 | 62.0 | 56.4 | 61.3 | 54.5 |
| $d_{10}$ | 9.0 | 11.7 | 5.9 | 8.9 | 7.4 | 5.0 |
| $d_{50}$ | 19.2 | 22.5 | 19.3 | 15.7 | 13.8 | 11.0 |
| $d_{90}$ | 43.0 | 50.7 | 41.6 | 37.7 | 26.8 | 30.4 |
| $(d_{50} - d_{10})/d_{50}$ | 0.53 | 0.48 | 0.69 | 0.43 | 0.47 | 0.55 |
| $(d_{90} - d_{10})/d_{50}$ | 1.77 | 1.73 | 1.86 | 1.83 | 1.41 | 2.31 |
| % Mullite | — | — | — | — | — | — |
| % Spinel | — | — | — | — | — | — |
| Axial I-Ratio | — | — | 0.40 | 0.39 | 0.39 | 0.39 |
| Transverse I-Ratio | 0.91 | 0.88 | 0.90 | 0.91 | 0.90 | 0.88 |
| CTE - [34.4(Axial I-ratio)-8.7] | — | — | 1.1 | 1.7 | 1.2 | 0.5 |
| CTE - [40.0-40.6(Transverse I-ratio)] | 2.7 | 2.6 | 2.7 | 3.3 | 2.4 | 0.9 |
| $M_A$ | — | — | 2646 | 2418 | 2347 | 2374 |
| $M_T$ | 2374 | 2169 | 2141 | 2471 | 2512 | 2432 |

The present invention has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. A porous cordierite ceramic honeycomb article, comprising:

$M_A$<2220, or $M_T$>2660 wherein $M_A$=3645($I_A$)−106($CTE$)+19($d_{90}$)+17(% porosity), $M_T$=4711($I_T$)+116($CTE$)−26($d_{90}$)−28(% porosity), CTE from 25 to 800° C. of not more than 9×10$^{-7}$/° C.; and a median pore diameter, $d_{50}$, wherein 10 μm ≦$d_{50}$≦25 μm.

2. The porous cordierite ceramic honeycomb article of claim 1, further comprising % porosity of at least 40% and less than 54%.

3. A porous cordierite ceramic honeycomb article, comprising:

$M_A$<2220, or $M_T$>2660 wherein $M_A$=3645($I_A$)−106($CTE$)+19($d_{90}$)+17(% porosity), $M_T$=4711($I_T$)+116($CTE$)−26($d_{90}$)−28(% porosity), CTE from 25 to 800° C. of not more than 9×10$^{-7}$/° C.; and a median pore diameter, $d_{50}$, wherein $d_{50}$≧13 μm.

4. The porous cordierite ceramic honeycomb article of claim 1, further comprising CTE≦8×10$^{-7}$/° C. (25-800° C.) in at least one direction.

5. The porous cordierite ceramic honeycomb article of claim 1, further comprising CTE≦5×10$^{-7}$/° C. (25-800° C.) in at least one direction.

6. The porous cordierite ceramic honeycomb article of claim 1, further comprising:

$M_A$<2000, or $M_T$>2900.

7. A porous cordierite ceramic honeycomb article, comprising:

$M_A<1800$, or $M_T>3000$ wherein $M_A=3645(I_A)-106(CTE)+19(d_{90})+17(\% \text{ porosity})$, $M_T=4711(I_T)+116(CTE)-26(d_{90})-28(\% \text{ porosity})$, and CTE from 25 to 800° C. of not more than $9\times10^{-7}/°$ C.

8. A porous cordierite ceramic honeycomb article, comprising:

$M_A<2220$, or $M_T>2660$ wherein $M_A=3645(I_A)-106(CTE)+19(d_{90})+17(\% \text{ porosity})$, $M_T=4711(I_T)+116(CTE)-26(d_{90})-28(\% \text{ porosity})$, % porosity≤52%, $d_{90}\leq29$ um, $I_A\leq0.33$, CTE≤$8\times10^{-7}/°$ C. (25-800° C.) in at least one direction, and $d_{50}\geq10$ um.

9. The porous cordierite ceramic honeycomb article of claim 1 wherein the article is a honeycomb wall-flow particulate filter.

10. A porous cordierite ceramic honeycomb article, comprising:

$M_A<2220$, and $M_T>2660$ wherein $M_A=3645(I_A)-106(CTE)+19(d_{90})+17(\% \text{ porosity})$, $M_T=4711(I_T)+116(CTE)-26(d_{90})-28(\% \text{ porosity})$, and CTE from 25 to 800° C. of not more than $9\times10^{-7}/°$ C.

11. A porous cordierite ceramic honeycomb article, comprising:

$M_A<2220$, and $M_T>2660$ wherein $M_A=3645(I_A)-106(CTE)+19(d_{90})+17(\% \text{ porosity})$, $M_T=4711(I_T)+116(CTE)-26(d_{90})-28(\% \text{ porosity})$, CTE from 25 to 800° C. of not more than $9\times10^{-7}/°$ C., and an elastic modulus, E, at 25° C. of less than $1.3\times10^6$ PSI in a 200/20 cell geometry.

12. A porous cordierite ceramic honeycomb article, comprising:

$M_A<2220$, and $M_T>2660$ wherein $M_A=3645(I_A)-106(CTE)+19(d_{90})+17(\% \text{ porosity})$, $M_T=4711(I_T)+116(CTE)-26(d_{90})-28(\% \text{ porosity})$, CTE from 25 to 800° C. of not more than $9\times10^{-7}/°$ C., and $E_R<1.20$ wherein $E_R$ is a ratio of the elastic modulus at 1000° C., E', to an elastic modulus at 25° C., E.

13. A porous cordierite ceramic honeycomb article, comprising:

$M_A<2220$, or $M_T>2660$ wherein $M_A=3645(I_A)-106(CTE)+19(d_{90})+17(\% \text{ porosity})$, $M_T=4711(I_T)+116(CTE)-26(d_{90})-28(\% \text{ porosity})$, % porosity of at least 44% and not more than 53%, $10\ \mu m\leq d_{50}\leq20\ \mu m$, $d_{90}\leq33\ \mu m$, $(d_{50}-d_{10})/d_{50}\leq0.55$, and CTE≤$8\times10^{-7}/°$ C. (25-800° C.) in at least one direction.

14. The porous cordierite ceramic article of claim 13, further comprising:

CTE≤$6\times10^{-7}/°$ C. in at least one direction.

15. A porous cordierite ceramic honeycomb article, comprising:

$M_A<2220$, or $M_T>2660$ wherein $M_A=3645(I_A)-106(CTE)+19(d_{90})+17(\% \text{ porosity})$, $M_T=4711(I_T)+116(CTE)-26(d_{90})-28(\% \text{ porosity})$, % porosity of at least 46% and not more than 53%, $12\ \mu m\leq d_{50}\leq19\ \mu m$, $d_{90}\leq30\ \mu m$, $(d_{50}-d_{10})/d_{50}\leq0.50$, and CTE≤$8\times10^{-7}/°$ C. (25° C.-800° C.) in at least one direction.

16. The porous cordierite ceramic honeycomb article of claim 15, further comprising:

$(d_{50}-d_{10})/d_{50}\leq0.40$.

17. A porous cordierite ceramic honeycomb article, comprising $M_A<2220$, or $M_T>2660$ wherein $M_A=3645(I_A)-106(CTE)+19(d_{90})+17(\% \text{ porosity})$, $M_T=4711(I_T)+116(CTE)-26(d_{90})-28(\% \text{ porosity})$, CTE from 25 to 800° C. of not more than $9\times10^{-7}/°$ C., and $I_T>0.86$.

18. A porous cordierite ceramic honeycomb article, comprising:

$M_A<2220$, or $M_T>2660$ wherein $M_A=3645(I_A)-106(CTE)+19(d_{90})+17(\% \text{ porosity})$, $M_T=4711(I_T)+116(CTE)-26(d_{90})-28(\% \text{ porosity})$, CTE from 25 to 800° C. of not more than $9 \times 10^{-7}/°$ C., and $I_A < 0.40$.

19. The porous cordierite ceramic article of claim 1, further comprising $d_{90} \leq 30$ μm.

20. A porous cordierite ceramic honeycomb article, comprising:

$M_A < 2220$, or $M_T > 2660$ wherein $M_A = 3645\ (I_A) - 106\ (CTE) + 19\ (d_{90}) + 17\ (\%\ \text{porosity})$, $M_T = 4711\ (I_T) + 116\ (CTE) - 26\ (d_{90}) - 28\ (\%\ \text{porosity})$, CTE from 25 to 800° C. of not more than $9 \times 10^{-7}/°$ C., and a thermal shock parameter, TSP$\geq 550°$ C.

wherein $TSP = MOR(25°\ C.) / \{[E(25°\ C.)][CTE'(500\text{-}900°\ C.)]\}$.

21. A porous cordierite ceramic honeycomb article, comprising:

$M_A < 2220$, or $M_T > 2660$ wherein $M_A = 3645\ (I_A) - 106\ (CTE) + 19\ (d_{90}) + 17\ (\%\ \text{porosity})$, $M_T = 4711\ (I_T) + 116\ (CTE) - 26\ (d_{90}) - 28\ (\%\ \text{porosity})$, CTE from 25 to 800° C. of not more than $9 \times 10^{-7}/°$ C., and a ratio of MOR/E at about 25° C. which is greater than or equal to 0.073%.

22. A porous cordierite ceramic honeycomb article, comprising:

$M_A < 2220$, or $M_T > 2660$ wherein $M_A = 3645\ (I_A) - 106\ (CTE) + 19\ (d_{90}) + 17\ (\%\ \text{porosity})$, $M_T = 4711\ (I_T) + 116\ (CTE) - 26\ (d_{90}) - 28\ (\%\ \text{porosity})$, CTE from 25 to 800° C. of not more than $9 \times 10^{-7}/°$ C., and $d_f \leq 0.40$ wherein $d_f = (d_{50} - d_{10})/d_{50}$.

23. The porous cordierite ceramic article of claim 22, further comprising $d_f \leq 0.36$ wherein $d_f = (d_{50} - d_{10})/d_{50}$.

24. The porous cordierite ceramic article of claim 22, further comprising % porosity greater than or equal to 48% and less than 54%.

25. A porous cordierite ceramic honeycomb article, comprising:

$M_A < 2000$, and $M_T > 2800$ wherein $M_A = 3645\ (I_A) - 106\ (CTE) + 19\ (d_{90}) + 17\ (\%\ \text{porosity})$, $M_T = 4711\ (I_T) + 116\ (CTE) - 26\ (d_{90}) - 28\ (\%\ \text{porosity})$, and CTE from 25 to 800° C. of not more than $9 \times 10^{-7}/°$ C.

26. A porous cordierite ceramic honeycomb article, comprising:

$M_A < 2220$, or $M_T > 2660$ wherein $M_A = 3645\ (I_A) - 106\ (CTE) + 19\ (d_{90}) + 17\ (\%\ \text{porosity})$, $M_T = 4711\ (I_T) + 116\ (CTE) - 26\ (d_{90}) - 28\ (\%\ \text{porosity})$, CTE from 25 to 800° C. of not more than $9 \times 10^{-7}/°$ C., and a mean CTE ($10^{-7}/°$ C.) from 25 to 800° C. in the axial direction that is greater than the quantity defined as $34.4\ (I_A) - 8.7$.

27. A porous cordierite ceramic honeycomb article, comprising:

$M_A < 2220$, or $M_T > 2660$ wherein $M_A = 3645\ (I_A) - 106\ (CTE) + 19\ (d_{90}) + 17\ (\%\ \text{porosity})$, $M_T = 4711\ (I_T) + 116\ (CTE) - 26\ (d_{90}) - 28\ (\%\ \text{porosity})$, CTE from 25 to 800° C. of not more than $9 \times 10^{-7}/°$ C., and a mean CTE ($10^{-7}/°$ C.) from 25 to 800° C. in the axial direction that is greater than the quantity defined as $40.0 - 40.6\ (I_T)$.

28. A method of manufacturing a porous ceramic cordierite honeycomb article, comprising the steps of:

mixing inorganic raw materials containing talc, an alumina-forming source, a silica-forming source, and 0-18 wt. % of a kaolin or calcined kaolin containing not more than 8 wt. % of a fine kaolin source having a median particle diameter of less than 7 μm, or if greater than 8 wt. % of the fine kaolin source then using a slow ramp rate during firing, with processing aids and optionally a pore forming agent to form a plasticized mixture, forming the plasticized mixture into a honeycomb structure, and firing the honeycomb structure to form the porous ceramic cordierite honeycomb article having a porosity <54% wherein if greater than 8 wt. % fine kaolin source is used, then the slow ramp rate includes a heating rate from 1200 to 1300° C. of not more than 20° C./hr, and wherein the alumina-forming source includes, in part, a highly derpersible power having a median particle of less then 1 μm which comprises not more than 10 wt. % of the inorganic raw materials.

29. A method of manufacturing a porous ceramic cordierite honeycomb article, comprising the steps of:

mixing inorganic raw materials containing talc, an alumina-forming source, a silica-forming source, and 0-18 wt. % of a kaolin or calcined kaolin containing not more than 8 wt. % of a fine kaolin source having a median particle diameter of less than 7 μm, or if greater than 8 wt. % of the fine kaolin source then using a slow ramp rate during firing, with processing aids and optionally a pore forming agent to form a plasticized mixture, forming the plasticized mixture into a honeycomb structure, and firing the honeycomb structure to form the porous ceramic cordierite honeycomb article having a porosity <54% wherein if greater than 8 wt. % fine kaolin source is used, then the slow ramp rate includes a heating rate from 1200 to 1300° C. of not more than 20° C./hr, and wherein the talc includes an XRD talc morphology Index of between 0.6 and 1.0.

30. The method of manufacturing of claim 29 wherein the talc includes an XRD talc morphology Index is at least 0.85.

31. A method of manufacturing a porous ceramic cordierite honeycomb article, comprising the steps of:
   mixing inorganic raw materials containing talc, an alumina-forming source, a silica-forming source, and 0-18 wt. % of a kaolin or calcined kaolin containing not more than 8 wt. % of a fine kaolin source having a median particle diameter of less than 7 μm, or if greater than 8 wt. % of the fine kaolin source then using a slow ramp rate during firing, with processing aids and optionally a pore forming agent to form a plasticized mixture,
   forming the plasticized mixture into a honeycomb structure, and
   firing the honeycomb structure to form the porous ceramic cordierite honeycomb article having a porosity <54% wherein if greater than 8 wt. % fine kaolin source is used, then the slow ramp rate includes a heating rate from 1200 to 1300° C. of not more than 20° C./hr, and
   wherein the porous ceramic cordierite honeycomb article comprises:

$M_A$<2000, or $M_T$>2900 wherein $M_A = 3645\ (I_A) - 106\ (CTE) + 19\ (d_{90}) + 17\ (\%\ porosity),$ $M_T = 4711\ (I_T) + 116\ (CTE) - 26\ (d_{90}) - 28\ (\%\ porosity).$ 32. A method of manufacturing a porous ceramic cordierite honeycomb article, comprising the steps of:
   mixing inorganic raw materials containing talc, an alumina-forming source, a silica-forming source, and 0-18 wt. % of a kaolin or calcined kaolin containing not more than 8 wt. % of a fine kaolin source having a median particle diameter of less than 7 μm, or if greater than 8 wt. % of the fine kaolin source then using a slow ramp rate during firing, with processing aids and optionally a pore forming agent to form a plasticized mixture,
   forming the plasticized mixture into a honeycomb structure, and
   firing the honeycomb structure to form the porous ceramic cordierite honeycomb article having a porosity <54% wherein if greater than 8 wt. % fine kaolin source is used, then the slow ramp rate includes a heating rate from 1200 to 1300° C. of not more than 20° C./hr, and
   wherein the porous ceramic cordierite honeycomb article comprises $d_{90} \leqq 33$ μm.

* * * * *

UNITED STATES PATENT AND TRADEMARK OFFICE
CERTIFICATE OF CORRECTION

| | |
|---|---|
| PATENT NO. | : 7,520,911 B2 |
| APPLICATION NO. | : 11/291687 |
| DATED | : April 21, 2009 |
| INVENTOR(S) | : Douglas Munroe Beall et al. |

Page 1 of 1

It is certified that error appears in the above-identified patent and that said Letters Patent is hereby corrected as shown below:

| Col. | Line | Description |
|---|---|---|
| On the Title Pg Item (57) | 5 | "$M_{A\,=\,3645}\,(I_A)$" should be -- $M_A = 3645\,(I_A)$ --. |
| On the Title Pg Item (57) | 6 | "$M_{T\,=\,4711}\,(I_T)$" should be -- $M_T = 4711\,(I_T)$ --. |
| 37 | 47 | "and" should be -- or --. |
| 37 | 61 | "and" should be -- or --. |
| 39 | 33 | "$(d_{90\,1})$-28" should be -- $(d_{90}) - 28$ --. |
| 40 | 48 | "derpersible power" should be -- dispersible powder --. |
| 40 | 48 | "particle of" should be -- particle diameter of --. |

Signed and Sealed this

Fourth Day of May, 2010

David J. Kappos
*Director of the United States Patent and Trademark Office*